United States Patent [19]

Perreault et al.

[11] Patent Number: 5,793,307
[45] Date of Patent: Aug. 11, 1998

[54] METHOD AND APPARATUS FOR A HYBRID LIMITED CONTENTION AND POLLING PROTOCOL

[75] Inventors: John A. Perreault, Hopkinton; Abhay Joshi; Mete Kabatepe, both of Norwood; Lawrence W. Lloyd, Wrentham; Stephen Schroeder, Stoughton, all of Mass.

[73] Assignee: Motorola, Inc., Schaumburg, Ill.

[21] Appl. No.: 437,106

[22] Filed: May 5, 1995

[51] Int. Cl.$^6$ .................................................. G05B 23/00
[52] U.S. Cl. .................. 340/825.5; 340/825.08; 364/240.8; 395/289; 370/451
[58] Field of Search ............. 340/825.08, 825.5, 340/825.51, 825.07, 505, 517; 364/240, 240.8, 241; 370/235, 346, 449, 450, 451; 395/289

[56] References Cited

U.S. PATENT DOCUMENTS

| | | | |
|---|---|---|---|
| 5,132,680 | 7/1992 | Tezuka et al. | 340/825.08 |
| 5,161,151 | 11/1992 | Kimura et al. | 340/825.08 X |
| 5,166,675 | 11/1992 | Amemiya | 340/825.08 |
| 5,479,406 | 12/1995 | Matsutani | 340/825.08 X |

FOREIGN PATENT DOCUMENTS

| | | | |
|---|---|---|---|
| 4-90230 (A) | 3/1992 | Japan | 340/825.5 |

Primary Examiner—Michael Horabik
Assistant Examiner—William H. Wilson, Jr.
Attorney, Agent, or Firm—Nancy R. Gamburd; Jeffrey T. Klayman

[57] ABSTRACT

An apparatus and method to implement a hybrid contention and polling protocol for a communications or computer network is disclosed. Various apparatus and method embodiments of the invention employ specific polls from a primary station for polling identified secondary stations of the network which may be in an active state; limited contention polls to an identified individual secondary station which may be in an idle state or to an identified subset of a plurality of secondary stations which may be in an idle state to initiate limited contention access to the network; limited contention polls for collision resolution in the event that a plurality of secondary stations in an idle state may have simultaneously contended for network access; general polls to any of a plurality of secondary stations of the network which may be in an unresponsive state to initiate contention access to the network; and general polls for collision resolution in the event that a plurality of secondary stations may simultaneously contend for network access. Various embodiments may also include frequency channel allocation for transmission and reception of data and other information within the network.

72 Claims, 8 Drawing Sheets

METHOD AND APPARATUS FOR A HYBRID LIMITED CONTENTION AND POLLING PROTOCOL

FIELD OF THE INVENTION

This application relates to devices, methods and protocols for implementing, accessing and controlling communications and computer networks including, but not limited to, methods and apparatus relating to communications and computer networks employing contention access, polling access, or token ring access.

CROSS REFERENCE TO RELATED APPLICATIONS

This application is related to the following United States Patent Applications, filed May 2, 1995 by the applicants and incorporated by reference herein, as follows:

U.S. Ser. No. 08/432,749 System For Determining The Frequency Of Repetitions Of Polling Active Stations Relative To The Polling Of Inactive Stations; allowed and pending.

U.S. Ser. No. 08/433,905 Method And System For Providing Access By Secondary Stations To A Shared Transmission Medium; now U.S. Pat. No. 5,596,577.

U.S. Ser. No. 08/433,877 Method, Device And Data Communication System For Multilink Polling; pending.

U.S. Ser. No. 08/433,878 Method And System For Management Of Frequency Spectrum Among Multiple Applications On A Shared Medium; now U.S. Pat. No. 5,608,727.

U.S. Ser. No. 08/433,876 System And Method For Hybrid Contention/Polling Protocol Collision Resolution Using A Depth First Search Technique; and now U.S. Pat. No. 5,651,009.

U.S. Ser. No. 08/434,334 System And Method For Hybrid Contention/Polling Protocol Collision Resolution Using Backoff Timers With Polling now U.S. Pat. No. 5,684,802.

BACKGROUND OF THE INVENTION

Modern computer or other communications networks typically involve a primary station or device, such as a file server, a personal computer, a computer workstation, a mainframe computer, a supercomputer, or any other type of computer, coupled or connected through a communications channel to a larger number of secondary stations or devices, such as data terminals, personal computers, workstations, or other computers. The communications channel may be any type or kind of transmission media, such as fiber optic cable, television cable or other coaxial cable, digital T1 or ISDN lines, twisted pair telephone lines, etc. The communication between the primary and secondary devices is typically bidirectional, with the primary station capable of transmitting information to and receiving information from each secondary station, and with each secondary station capable of transmitting information to and receiving information from the primary station. Secondary stations usually do not communicate directly with each other, but may communicate indirectly with each other through the primary station.

In many network environments, however, the network typically shares the transmission medium among several, many or all of the secondary stations or devices, rather than having a specific and dedicated transmission medium to each such individual secondary station or device. In such network environments in which such multiple secondary stations or devices share access to a transmission medium, a problem may be created in the event that more than one secondary station attempts to transmit information to the primary station during the same period of time. Accordingly, given the possibility that more than one device (primary or secondary) may be transmitting information on the medium simultaneously, there may then be the problem that such transmitted data collides or interferes with the other simultaneously transmitted data. Such "data collisions" typically result in the data of all of the transmitting stations becoming corrupted and useless.

Currently, in the prior art, there are two main types or categories of solutions to this potential data collision problem (and corresponding data corruption problem). The first, referred to as round robin access, involves a set of procedures wherein devices are allowed access to the medium in a sequential fashion, with no more than one device being permitted access to the medium at any one time. Round robin access, such as token ring access, may involve the passing of a token between peer stations. Only the station that has the token is permitted to transmit on the medium, thereby avoiding data collisions.

Another approach, referred to as polling, involves a single master or primary station controlling the access of slave, or secondary stations, to the transmission medium. The primary station controls the access of the secondary stations to the network medium by transmitting polls addressed to individual secondary stations in a sequential fashion. A secondary station, such as the first secondary station, is permitted to transmit on the shared medium only upon receiving a poll containing its specific, unique address or other means of identification. Upon completion of transmission, the primary station then transmits another poll to the second or next secondary station, and repeats the process until all secondary stations have been polled. The polling process then iterates or begins again with a poll to the first secondary station. By limiting transmission access to only the specific secondary station polled, data collisions may be avoided.

A second prior art solution, referred to as contention access, involves multiple secondary stations contending for the shared medium, often in an unordered and possibly random fashion. This contention access approach, however, assumes that data collisions may occur. Accordingly, protocols which provide shared access to a transmission medium using contention access also usually provide means for detecting that a collision has occurred, and means for resolving the transmission order among the contending secondary stations. These contention access protocols also include procedures and algorithms for retransmitting data subsequent to a collision, usually in such a manner as to reduce the likelihood of additional collisions.

A variety of such round robin and contention protocols, with applications to various network configurations or topographies, are discussed in A. Tanenbaum, *Computer Networks* (Prentice-Hall, Inc., Englewood Cliffs, N.J. 2d Ed, 1989).

A comparison of the performance of these two solutions indicates that contention access protocols generally perform well only under "lightly loaded" conditions, i.e., the devices sharing the medium have data available for transmission only infrequently, so that an excessive number of devices are not simultaneously contending for data transmission. As loading increases, however, the performance of these protocols may degrade due to the increased number of collisions. The time required for data transmission may increase significantly, as each collision further requires data retransmission, which may also result in additional collisions. As the data transmission load may continue to increase, networks employing contention access may simply cease to function, as the increased contention creates collisions indefinitely.

Round robin protocols, on the other hand, comparatively do not perform as well as contention protocols under lightly loaded conditions. Under conditions of a light data transmission load, these round robin protocols effectively waste significant transmission time due to the amount of time spent polling or passing tokens to stations which do not have any data available for transmission or which are unresponsive altogether. Protocols employing a polling discipline, by transmitting polls addressed to individual secondary stations in a sequential fashion, suffer performance degradation when a significant number of the secondary stations are unresponsive. The performance degradation comes about due to the time spent polling and waiting for responses from secondary stations which are not able to respond. Typically unresponsive secondary stations continue to be polled because the primary station has no knowledge of when an unresponsive secondary station may become able to respond. These protocols, however, may provide superior performance, compared to contention access protocols, under heavily loaded conditions, providing a sequential opportunity for each station to transmit without interfering and disabling collisions.

A need remains, therefore, for a single network communications protocol to have increased information transmission efficiency, such as reducing the time for and any time delays associated with information transmission, under both lightly loaded and heavily loaded conditions. In addition, needs continue to exist for such a single protocol to dynamically respond to potentially changing load conditions, from light to heavy and vice-versa, and to accommodate various user demand levels, from few to many users at any given time. A protocol should also meet these needs efficiently, by increasing transmission channel availability and decreasing the time required for effective information transmission.

DETAILED DESCRIPTION OF THE PREFERRED EMBODIMENT

Figure 1:
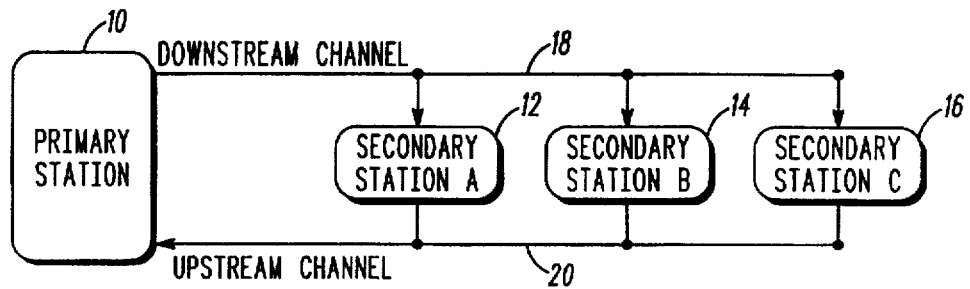
FIG. 1 is a block diagram illustrating an overall system configuration of an embodiment of the present invention.

The preferred embodiment of the invention disclosed herein provides a solution to the problem of performance degradation, under conditions of a light transmission load, caused by continually polling unresponsive or idle secondary stations, typical of most polling protocols. In addition, the preferred embodiment of the invention described herein provides a solution to the various data collision problems encountered in typical contention protocols, by minimizing the amount of time required to contact unresponsive or idle secondary stations and by confining and minimizing the effects of potential data collisions. As discussed in greater detail below, the preferred embodiment accomplishes these results, effectively and efficiently, by employing a novel hybrid protocol which dynamically utilizes various advantages or features of polling protocols with various advantages or features of contention protocols, in response to the various and potentially changing transmission load requirements or demands of the network. The preferred embodiment of the invention dynamically utilizes a specific polling discipline for controlling and providing network access to responsive, or active, secondary stations, uses a modified or limited contention polling discipline for controlling and providing access to idle secondary stations which had been active but are currently or have recently been inactive, and uses a general contention access discipline for controlling and providing network access by formerly unpolled and unresponsive secondary stations, in order to determine if any have become able to respond. In addition, the preferred embodiment provides for the majority of the network intelligence to reside in the primary station, thereby reducing the complexity and cost of the numerous secondary stations which may be incorporated in the network.

In the preferred embodiment of the present invention, secondary stations are considered to have three relevant states, and each secondary station will be in one of these three states at any particular time, and may transfer or transition from one state to another, and vice-versa, without further limitation. The first state, referred to as the unresponsive state, includes those secondary stations which are not currently able to communicate with the network, for example, because they may just be powering up and coming on line, or which have been quiescent and have otherwise not required network access or have not responded to network queries (because, for instance, the device has been powered down). The second state, referred to as an active state, includes those secondary stations which are able to communicate with the network, for example, those secondary stations which are on line, and which also have information available for transmission within the network. The third state, referred to as an idle or intermediate state, includes those secondary stations which are able to communicate with the network, for example, those secondary stations which are on line and responding to network queries, but which have not had information available for transmission within the network for some particular or predetermined period of time. For example, a formerly active secondary station which had transmitted data may transition to an idle state after a certain period of time has elapsed in which the secondary station has not had any data available for transmission. Both the active and the idle states are individually and collectively considered to be "responsive" states.

As used herein, "network" or "networks" includes computer networks, communications networks, or any other system for the transmission, reception, or other transfer of data or other information, such as video, graphics, text, etc., typically between and among two or more devices. "Data or other information" has a similarly broad interpretation, and may refer to any kind or type of information, such as video, graphics, sound, text, or any other material which might be encodeable and transmissable over a communications channel.

FIG. 1 is a block diagram illustrating an overall system configuration of an embodiment of the present invention. Referring to FIG. 1, a primary station 10 transmits data or other information to one or more secondary stations, identified as secondary station A 12, secondary station B 14, and secondary station C 16, on a transmission medium, referred to as a downstream channel 18. While three secondary stations are illustrated in FIG. 1 for ease of reference, it will be understood by those skilled in the art that many more secondary stations may be included within the network, numbering from the hundreds to the thousands. The various primary stations and secondary stations may be controller, processor or microprocessor embodiments, including any form or type of computer, such as mainframe computers, personal computers, workstations, supercomputers, or file servers, or may be other devices such as data terminals.

Also referring to FIG. 1, the downstream channel 18 and the upstream channel 20 may be separate and distinct transmission media, or may be physically combined within one transmission medium, such as a coaxial cable, a fiber optic cable, a telephone line, a television cable, a twisted pair line, or a digital line, and are referred to as separate channels solely to indicate the direction of the flow of transmitted information, namely, downstream from the primary station 10 to the various secondary stations 12, 14 and 16, and upstream from these various secondary stations 12, 14 and 16 to the primary station 10. In the preferred embodiment, the primary station 10 is the only device permitted to transmit in the downstream direction, i.e., on the downstream channel 18. Secondary stations 12, 14 and 16 transmit data and other information to the primary station 10 on the same transmission medium or a second transmission medium in the upstream direction, referred to as an upstream channel 20. Secondary stations may not be capable of transmitting data directly to another secondary station, but would first transmit upstream to the primary station 10, which would transmit or retransmit the information downstream to the appropriately identified secondary station.

Continuing to refer to FIG. 1, all secondary stations 12, 14 and 16 typically share the upstream channel. In order to prevent simultaneous or overlapping transmissions on the upstream channel 20 from corrupting data, in accordance with the present invention, only one such secondary station is permitted to transmit data at any one time. The primary station 10 controls which secondary station has access to and is permitted to transmit data on the upstream channel 20 by means of transmitting, on the downstream channel 18, special frames of information or data, referred to as specific polls, uniquely addressed to an identifiable secondary station among the plurality of secondary stations. The specific poll may be comprised of any predetermined, known or otherwise defined sequence or grouping of bits, bytes, words or data packet, which is recognizable by a secondary station as the defined or known sequence forming the specific poll. Upon receiving a specific poll on the downstream channel 18, with a singular or otherwise unique address that distinguishes or identifies a particular secondary station from the possibly numerous, plurality of secondary stations, or which a secondary station otherwise recognizes as a unique identification, the identified secondary station is then allowed access to transmit on the upstream channel 20. The actual amount of time that a secondary station is permitted access for transmission on the upstream channel may be determined by other means and, for example, may be determined by various parameters such as current activity or usage levels, network size, cost, etc. In addition, as discussed in greater detail with reference to alternative embodiments, various channel frequencies may be allocated by the primary station, rather than or in addition to transmission time allocations. Also as discussed in more detail below, upon receipt of another type of poll, a limited contention poll, an identified secondary station of a plurality of identified secondary stations may then be allowed access to transmit on the upstream channel 20.

Figure 2:
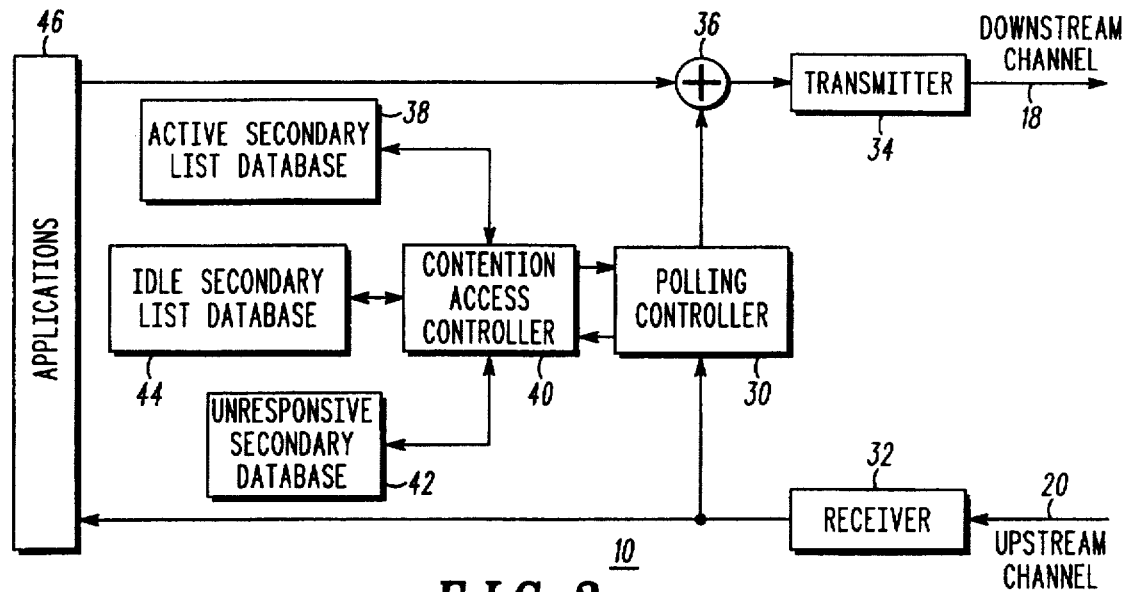
FIG. 2 is a block diagram illustrating a primary station of an embodiment of the present invention.

FIG. 2 is a block diagram illustrating a primary station of an embodiment of the present invention. Referring to FIG. 2, a primary station 10 includes a polling controller 30, a memory (such as RAM) or database of active secondary stations 38, a database of unresponsive secondary stations 42, a database of idle secondary stations 44, and a contention access controller 40. The polling controller 30 and the contention access controller 40 may or may not be embodied within or as the same device, for example, single or multiple microcontrollers or microprocessors. Similarly, the databases 38, 42 and 44 may be embodied together or separately in various memory circuits, such as RAM, EPROMs, etc., which also may be part of a larger memory capacity of, for example, a microprocessor or a computer. The contention access controller 40 determines or controls when to perform specific polling, limited contention polling, and when to allow general contention access, by issuing commands to the polling controller 30. By examing the active secondary station database (or list) 38, the idle secondary station database (or list) 44, and the unresponsive secondary station database (or list) 42, the contention access controller 40 may dynamically adjust the frequency and duration of specific access, limited and general contention access, in order to optimize overall performance. The polling controller 30 transmits polls, including specific polls, limited contention polls, and general polls (discussed in detail below), to one or more secondary stations on the downstream channel 18 via a transmitter 34. Also transmitted from the primary station on the downstream channel may be various applications, data or information, such as database search results, bulletin board materials, a graphic image, video, sound, a computer program, or any other network application. Such myriad application information, therefore, will be generally referred to as "information" or "applications", from the applications block 46 of the primary station 10. Those skilled in the art will appreciate that the applications block of the network may itself be a microprocessor, a computer, or another network access device.

Continuing to refer to FIG. 2, a summer, switch or multiplexer 36 is used to combine, mix or sequence the various polls with applications information or data, which also may be being sent by the applications block 46 on the downstream channel 18 to secondary stations. Information or data transmitted by secondary stations on the upstream channel 20 is received or accepted by a receiver 32 in the primary station 10. The receiver 32 may also be combined with the transmitter 34 as a unitary transceiver. In addition, depending upon the type of transmission medium, such as analog or digital, the transmitter and receiver may be various types of analog or digital modems or terminal adapters. The polling controller 30 also may examine all received data or other information as it is transmitted by or flows from the receiver 32 to the applications block 46.

Figure 3:
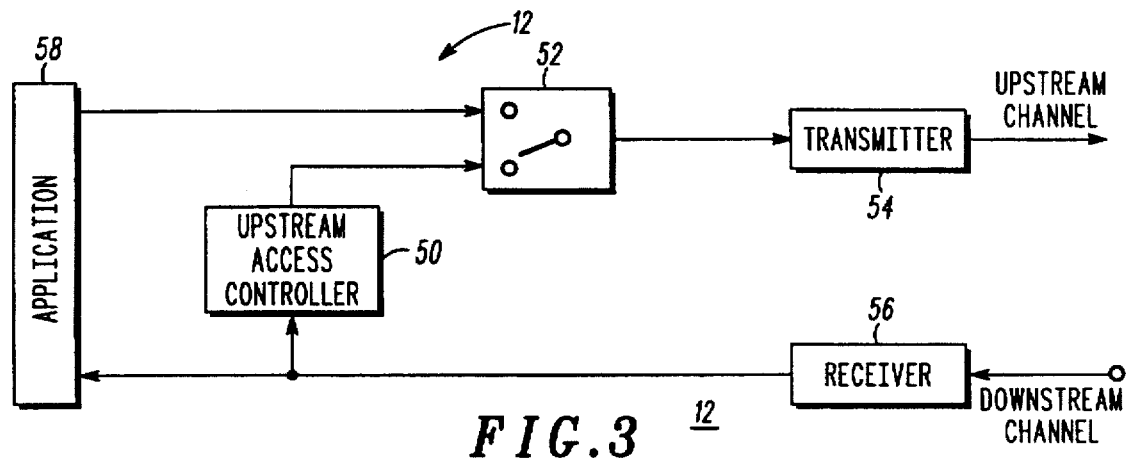
FIG. 3 is a block diagram illustrating a secondary station of an embodiment of the present invention.

FIG. 3 is a block diagram illustrating a secondary station of an embodiment of the present invention. Referring to FIG. 3, a secondary station 12 includes an upstream access controller 50, which examines all information or data received on the downstream channel 18, from the primary station, via a receiver 56. Some of the received information may be polls, general, specific, or limited contention, while other received information may be applications data, such as results from a requested database search, destined for the secondary station applications block 58. When the secondary station receives a specific poll, or in some instances a limited contention poll, which has an address identifying or otherwise recognized by the secondary station, the multiplexer ("mux") or switch 52 will be switched to couple or connect the applications information to the transmitter if the specific poll received is requesting that application data be transmitted to the primary station in response to the poll, or will be switched to couple a response if the limited contention poll is requesting a response to initiate limited contention. If information other than applications data or applications information, such as a control message, is to be sent in response to the received poll, then the mux 52 will be switched to connect the upstream access controller to the transmitter, to transmit, for example, information consisting of a negative acknowledgement indicating that the secondary station has no applications information or data ready or needed for upstream transmission. After the mux 52 has been switched to the appropriate position, the transmitter 54 may be activated and data or response transmission on the upstream channel 20 may commence. When the transmission is complete, the transmitter 54 may be deactivated.

Figure 4:
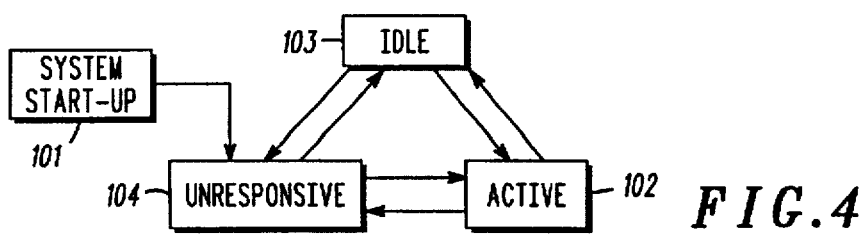
FIG. 4 is a flow chart illustrating various potential states of a secondary station of a preferred embodiment of the present invention.

The preferred embodiment of the invention is a hybrid protocol, having both method and apparatus embodiments, in which a primary station employs a specific polling discipline for controlling the access of one or more active secondary stations to a shared transmission medium, the upstream channel, employs a limited contention polling discipline for controlling the access of one or more idle secondary stations to the same upstream channel, and also employs a general contention discipline for controlling the access of unresponsive secondary stations to the same upstream channel. FIG. 4 is a flow chart illustrating various potential states of a secondary station of a preferred embodiment of the present invention. As shown in FIG. 4, a secondary station 100 may be in one of three states, active 102, idle 103, or unresponsive 104. From the standpoint of the secondary station, however, it need not be aware of any state or status difference between the active and idle states, i.e., the secondary station does not require any information concerning whether it is considered by the primary station to be in an active or an idle state. The secondary stations need only distinguish between the unresponsive state, on the one hand, and the active and/or idle states, on the other hand.

Continuing to refer to FIG. 4, a secondary station places itself in the unresponsive state 104 upon system startup, block 101. Once a secondary station transitions or changes from the unresponsive state 104, to either the idle state 103 or the active state 102, upon receipt of a general poll, followed by a specific or limited contention poll, it will return to the unresponsive state 104 (from either of the idle or active states) if it has determined that it has lost communication with the primary station. The transitions between the active and idle states may occur to optimize overall network performance, and will be discussed in greater detail below.

Figure 5A:
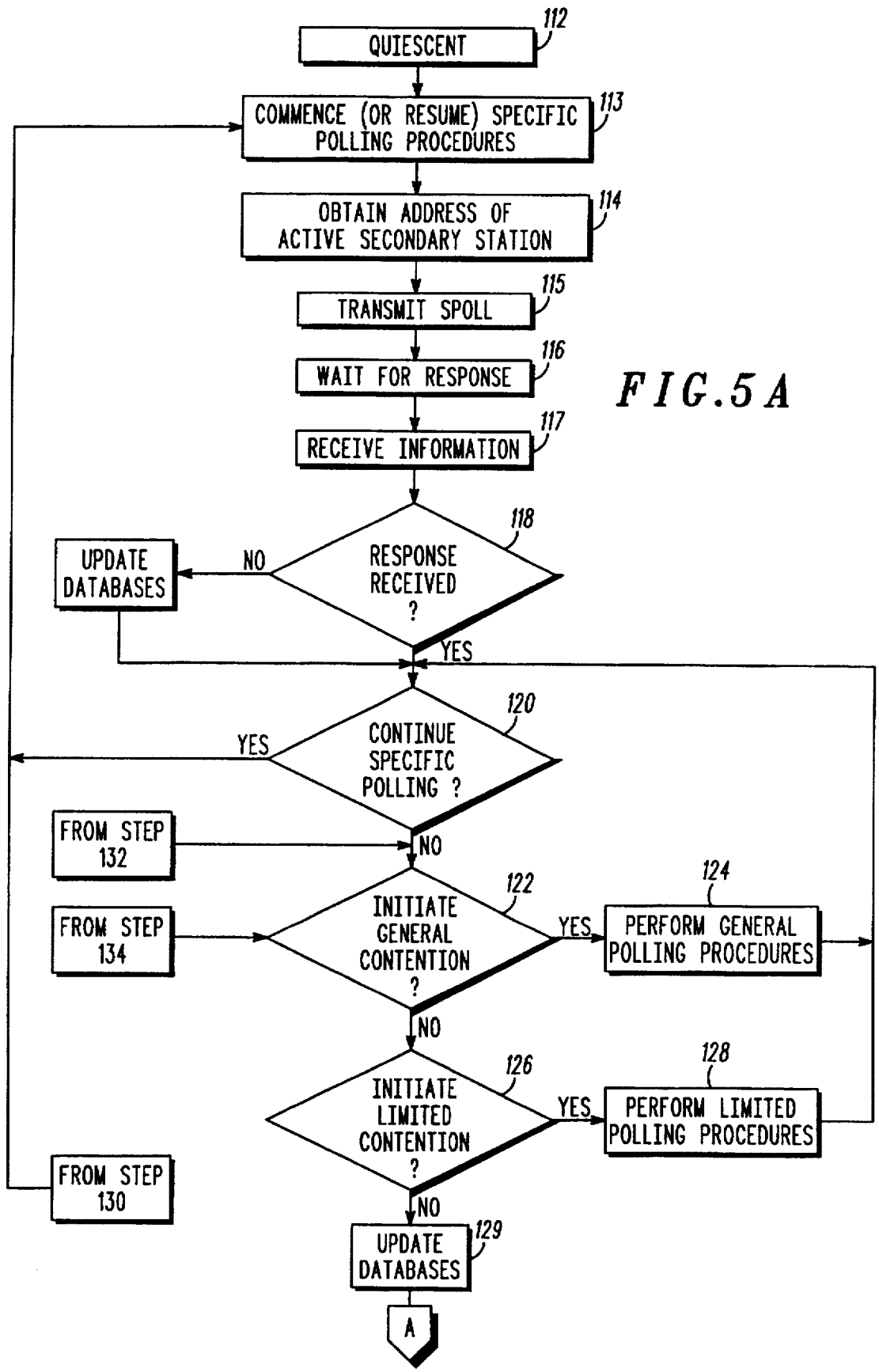
FIGS. 5A and 5B are a flow chart illustrating protocol procedures for a primary station of a preferred embodiment of the present invention.
Figure 5B:
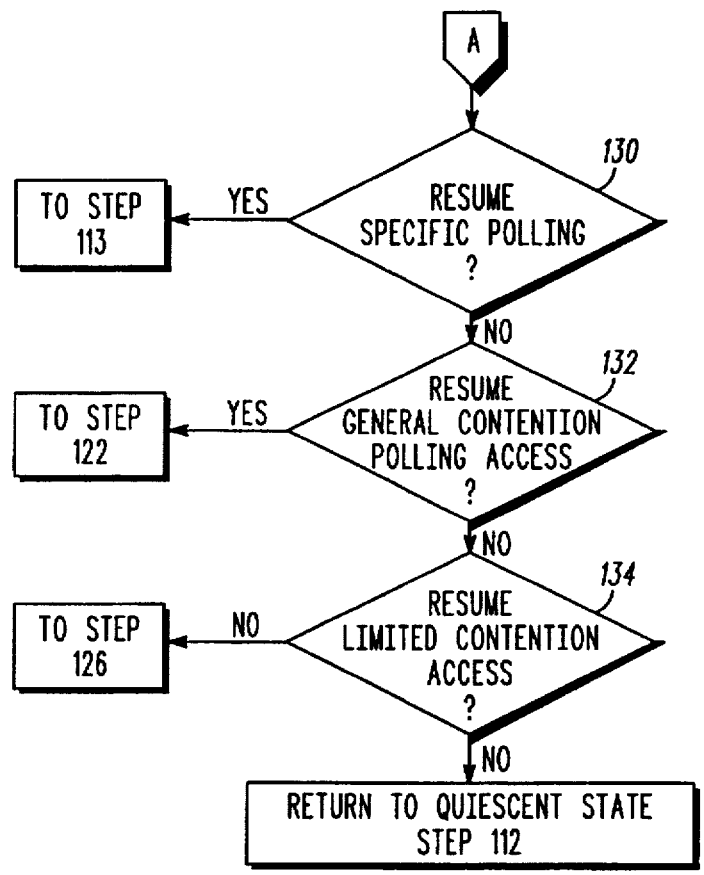

FIGS. 5A and 5B are a flow chart illustrating protocol procedures for a primary station of a preferred embodiment of the present invention. The protocol discipline makes use of several types of frames (also referred to as data or control frames, packets, or polling frames), the first frame referred to as a specific poll discussed above, abbreviated as "SPoll", a second type of frame referred to as a general poll, abbreviated as "GPoll", a third type of frame referred to as a limited contention poll, abbreviated as "LCPoll", and various other frames used for limited or general collision resolution procedures discussed below. The primary station 10 controls which secondary stations in an unresponsive state may have access to and subsequently be permitted to transmit data on the upstream channel 20 by means of transmitting, on the downstream channel 18, special frames of information or data, referred to as general polls, to the various secondary stations among the plurality of secondary stations. The general poll also may be comprised of any predetermined, known or otherwise defined sequence or grouping of bits, bytes, words or data packet, which is recognizable by a secondary station as the defined or known sequence forming the general poll. The primary station 10 also controls which secondary stations in an idle state may have access to and subsequently be permitted to transmit data on the upstream channel 20 by means of transmitting, on the downstream channel 18, special frames of information or data, referred to as limited contention polls, to a portion or subset of secondary stations among the plurality of secondary stations in an idle state, which portion or subset have been identified in the limited contention poll. The limited contention poll also may be comprised of any predetermined, known or otherwise defined sequence or grouping of bits, bytes, words or data packet, which is recognizable by a secondary station as the defined or known sequence forming the limited contention poll.

The primary station maintains a first database containing a list of all active secondary stations, referred to as the active database, a second database containing a list of all unresponsive secondary stations, referred to as the unresponsive database, and a third database containing a list of all idle secondary stations, referred to as the idle database. These databases themselves may also be separate or combined within one overall database, and also may be contained in any form of memory integrated circuit or any other memory circuitry, such as RAM, which also may be separate or combined in the same physical device. The contention access controller in the primary station maintains these databases and coordinates the dynamic utilization of the three access disciplines, specific polling, limited contention, and general contention.

Referring to FIGS. 5A and 5B the primary station may begin with or periodically enter or return to a quiescent or idle state 112, referred to as a quiescent state to distinguish it from the idle state of the various secondary stations. When the contention access controller in the primary station commands the polling controller to initiate specific polling of active devices, step 113, the polling controller will obtain the identifications ("IDs") or addresses of the active secondary stations from the active secondary database list, step 114. As each address is obtained from the active database, the polling controller will transmit, on the downstream channel, a specific poll (referred to or abbreviated as an "SPoll") containing the address of the active secondary station, step 115. Following the transmission of the SPoll, the primary station will wait for information, such as a response, from the secondary station, step 116. As discussed in greater detail below, after receiving a information from a secondary station, step 117, the primary station will determine if the information it received was a valid response, such as data or a negative acknowledgement, step 118. If a proper response was received, the primary station may resume or continue with specific polling procedures, step 120, returning to step 113, to receive another identification and transmit another specific poll, steps 114 and 115. If information such as no response information has been received after a predetermined period of time, however, the primary station may update or revise the active database to reflect the lack of response, step 119. The primary station may also resume specific polling and return to step 113, or may initiate the various contention procedures, step 120.

Figure 6:
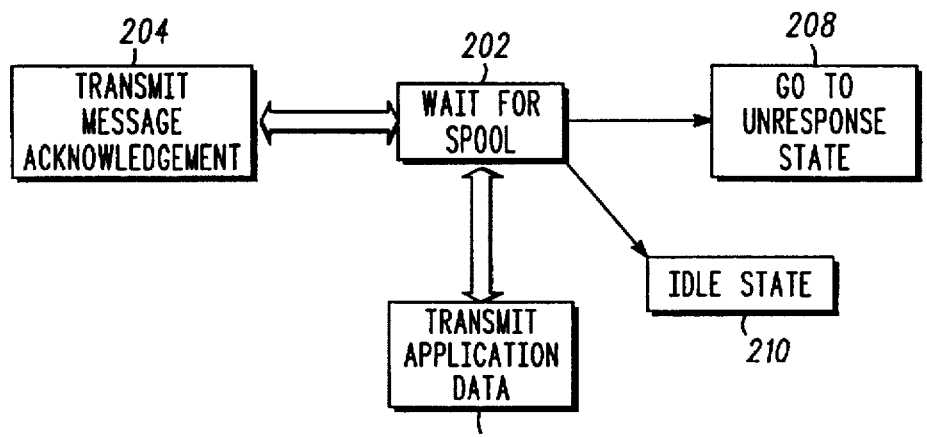
FIG. 6 is a flow chart illustrating specific polling procedures for a secondary station, in the active state, of a preferred embodiment of the present invention.

FIG. 6 is a flow chart illustrating specific polling procedures for a secondary station, in an active state, of a preferred embodiment of the present invention. A secondary station in the active state may wait for a specific poll, step 202. A secondary station in the active state, which has received an SPoll with its identification or an address that it recognizes, will then transmit information consisting of a response to the primary station, such as application data, if any is available for transmission, step 206, or information or a response consisting of a negative acknowledgement ("or NAK") if there is no application data available, step 204. Upon completion of transmission of such information or response, the secondary station returns to its waiting state, step 202. The amount of application data which may be transmitted in response to an SPoll is determined by other means. In addition, if communications with the primary station is lost or impaired, as may be indicated by information from the downstream channel, the secondary station may transition or change states, to an unresponsive state, step 208. Also as mentioned above, transparently to an active secondary station, it may also be placed in an idle state by the primary station, step 210.

Returning to FIG. 5A and 5B, upon receiving a response or other information from the secondary station in step 117, such as application data or a NAK, the primary station may resume specific polling, step 120, and return to step 113 and obtain the address of the next secondary station to be specifically polled from the list of active secondary stations in step 114, and will repeat the process described above. If the primary station does not receive any information or other response (i.e., receives "no response" information) after a predetermined period of time, however, then the contention access controller will be informed that the identified secondary station did not respond, steps 118 and 119, and, again, the next active secondary station may be polled, step 120, by returning to step 113. The lack of a response may indicate, for example, that the particular secondary station has gone off line and has powered down. Based upon how often an active secondary station (or idle secondary station) has repeatedly failed to respond to a sequence of specific polls (or limited contention polls) addressed or identifying that secondary station, the contention access controller may decide to remove the active secondary station (or idle secondary station) from the active database (or the idle database) and place the station in the unresponsive database.

By monitoring the number of secondary stations in the active, idle and unresponsive databases, the contention access controller may respond dynamically and determine how frequently to proceed with specific polling with active secondary stations, how frequently to initiate general contention access procedures to attempt to establish communications with unresponsive secondary stations, and how frequently to initiate limited contention procedures with idle secondary stations. When the contention access controller determines that it shall attempt communication with unresponsive secondary stations and initiate general contention access procedures, step 122, it will command the polling controller to initiate and perform general contention access procedures, step 124 shown in FIGS. 5A and 5B rather than continue with specific polling. When the general contention access procedures have been performed, the primary station may then resume other polling procedures, returning to step 120 and, again, performing the dynamic evaluation discussed above. If general contention access procedures are not indicated in step 122, the contention access controller may determine that it shall institute limited contention access procedures, step 126, and it will command the polling controller to initiate and perform limited contention access procedures, step 128. When the limited contention access procedures have been performed, the primary station may then resume other polling procedures, returning to step 120 and, again, performing the dynamic evaluation discussed above. If limited contention access procedures are not indicated in step 126, the primary station may then resume other polling procedures and, again, performing the dynamic evaluation discussed above. Specific polling may be resumed, step 130, general contention polling may be resumed, step 132, limited contention polling may be resumed, step 134, or the primary station may return to a quiescent state, step 112.

Figure 7:
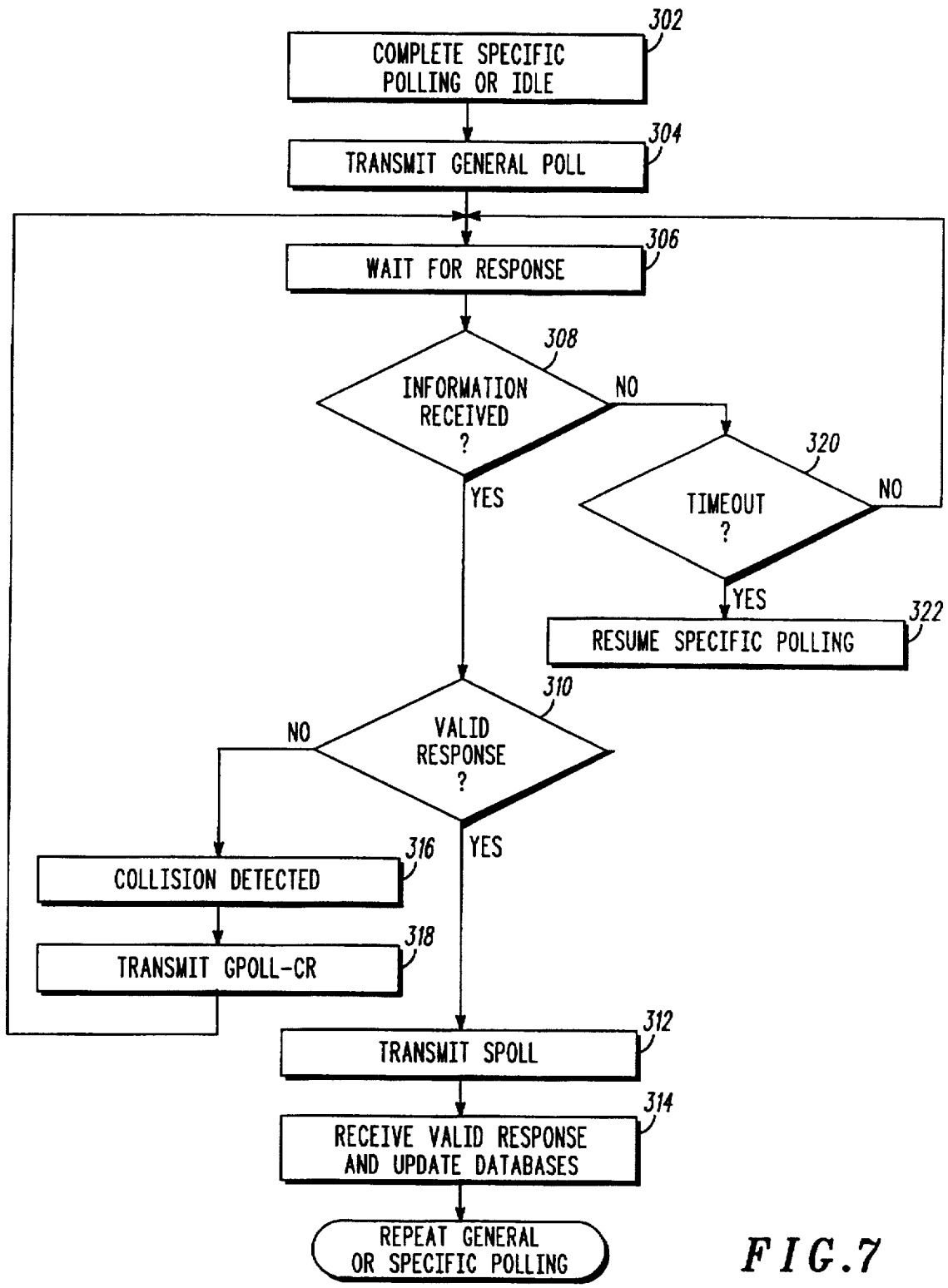
FIG. 7 is a flow chart illustrating general contention access procedures for a primary station of a preferred embodiment of the present invention.

FIG. 7 is a flow chart illustrating general contention access procedures for a primary station of a preferred embodiment of the present invention. Upon receiving a command to initiate general contention access procedures, the polling controller will complete polling procedures for the active secondary station currently being polled, will complete limited contention polling procedures for the idle secondary stations currently being polled, or will be in a quiescent state if such specific or limited polling is already completed or unnecessary, step 302. The polling controller will then suspend specific and limited polling procedures and commence general contention access procedures by transmitting a general poll, abbreviated or referred to as a "GPoll", on the downstream channel, step 304. The polling controller will then wait for a response from the secondary stations, step 306. Unresponsive secondary stations that receive a GPoll, if able (for example, powered up), will transmit information, such as a response on the upstream channel requesting to become active. Having waited for a response from the secondary stations (step 306), the polling controller will determine if it has received information, such as a response, within a predetermined period of time, step 308. If the polling controller has not received information or a response of some kind within that time period, it will "timeout" and end the general contention access process, step 320, and, for example, may recommence specific or limited polling, step 322.

Each secondary station which responded to the GPoll will then wait to receive, on the downstream channel, a specific poll or a limited contention poll containing its address as an indication from the primary station that its response to the GPoll was received correctly and that they are now in either an active or idle state. Correspondingly, the primary station determines if it has received information from a secondary station, step 308 of FIG. 7, and, if it has received information, the primary station determines if the information was a valid response requesting transfer to an active or idle status, step 310 of FIG. 7. Continuing to refer to FIG. 7, if a valid response was received following transmission of a GPoll, then the polling controller will transmit a specific poll or a limited contention poll to that secondary station confirming that the response was received correctly and that the secondary station is now either active or idle, step 312. The polling controller will inform the contention access controller of the valid response, and the contention access controller will add the secondary device to the corresponding active database or idle database and remove it from the unresponsive database, step 314.

Continuing to refer to FIG. 7, step 310, if an invalid response is received by the primary station following transmission of a GPoll, then it may be assumed that more that one secondary station transmitted a response to the GPoll and that a data or response collision may have occurred or resulted, step 316. The primary station will then transmit a general poll for collision resolution, abbreviated or referred to herein as a "GPoll-CR", step 318. The collision resolution procedures are discussed in more detail below with regard to FIG. 8. Continuing to refer to FIG. 7, however, once the primary station has transmitted a GPoll-CR, the primary station will wait for a response to the GPoll-CR, returning to step 306. Again, as discussed above, the primary station will determine both if it has received a response, step 308, and if it has received a valid response, step 310, and if so, continuing with steps 312 and 314 to transfer the secondary station to an active or idle status and update the corresponding databases.

Figure 8:
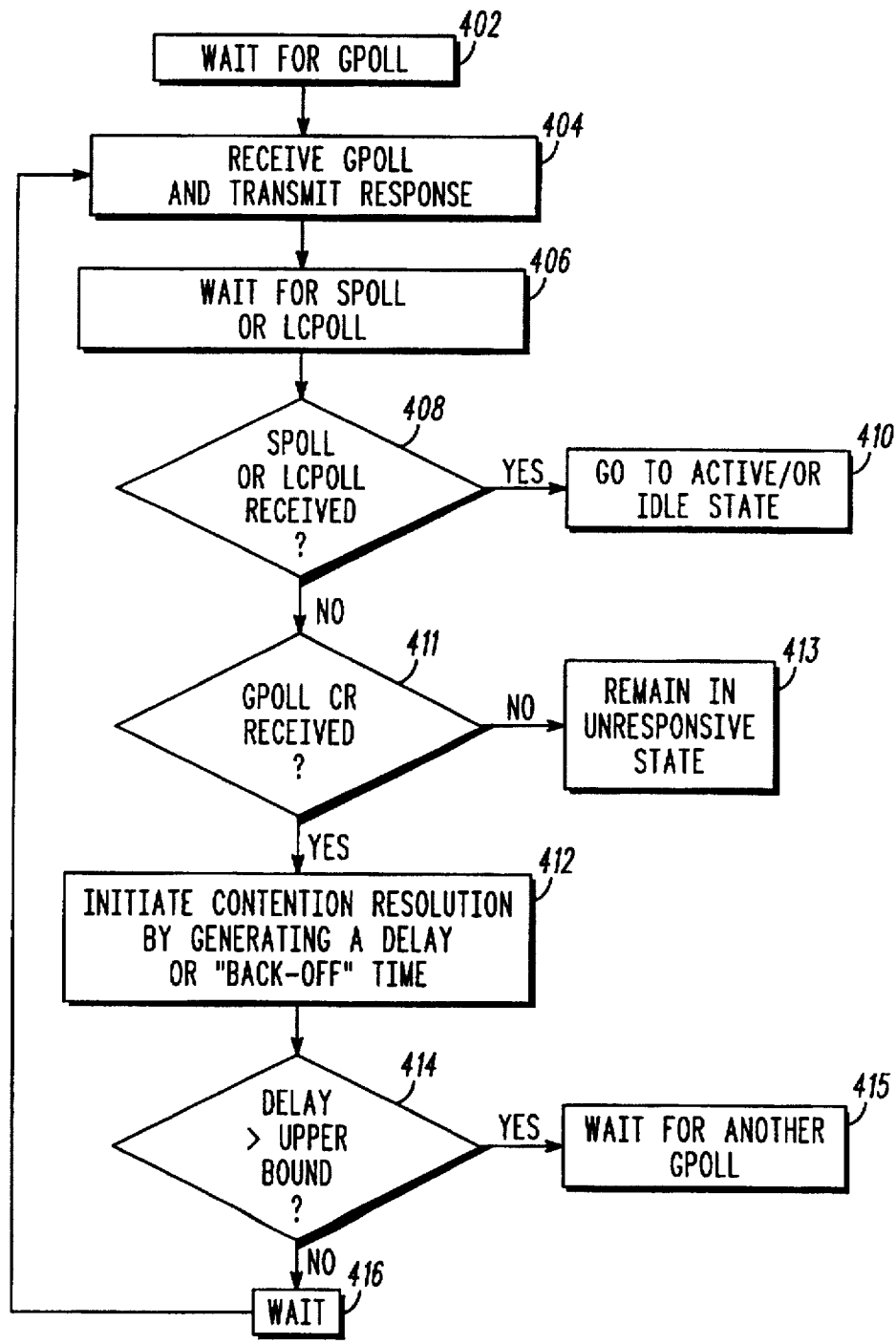
FIG. 8 is a flow chart illustrating the general contention and general contention collision resolution procedures for a secondary station, in the unresponsive state, of a preferred embodiment of the present invention.

FIG. 8 is a flow chart illustrating in greater detail the general contention and general contention collision resolution procedures for a secondary station, in an unresponsive state, of a preferred embodiment of the present invention. As discussed in reference to FIG. 7, in the event that the polling controller has detected a response to a general contention poll which is invalid, a collision of responses is presumed to have occurred. In such case, the polling controller will transmit, on the downstream channel, another type of poll previously mentioned and referred to as a general poll for collision resolution ("GPoll-CR"). The general poll for collision resolution also may be comprised of any predetermined, known or otherwise defined sequence or grouping of bits, bytes, words or data packet, which is recognizable by a secondary station as the defined or known sequence forming the general poll for collision resolution. Any secondary station that had previously transmitted a response to a GPoll, and which then receives a GPoll-CR from the primary station, will then initiate general collision resolution procedures as indicated in FIG. 8.

Referring to FIG. 8, a secondary station in an unresponsive state which then, for example, has been powered up in order to enter the network in an active or idle state, will then wait for a GPoll to begin contention access procedures, step 402. Upon receiving a GPoll, the secondary station will transmit a response, step 404. The secondary station will then wait for another poll from the primary station, either a specific poll or a limited contention poll (both containing the proper identification of the secondary station), or will wait for a GPoll-CR indicating that the previous response of the secondary station to the GPoll collided with that of another secondary station or a plurality of other secondary stations, step 406. If the secondary station receives a specific poll or a limited contention poll in step 408, the secondary station transitions to an active or idle state, step 410. If the secondary station does not receive an SPoll or LCPoll in step 408, and instead receives a GPoll-CR in step 411, the secondary station initiates general collision resolution procedures. Correspondingly, the other secondary stations which had also responded to the GPoll and which received a GPoll-CR will also initiate contention resolution procedures, and will be a general contending secondary station. Each such general contending secondary station will initiate general collision resolution procedures by generating a delay period or "backoff time", step 412. The backoff time may be generated randomly, for example, in the preferred embodiment, or by using any type of desired algorithm which would tend to generate a non-duplicative, distinct, or different amount of time for each general contending secondary station involved in the general collision resolution procedures. The backoff time will be a period of time, predetermined or random, for which the general contending secondary station will delay its transmission of its response to the GPoll-CR. Accordingly, in the preferred embodiment of the invention, each such general contending secondary station will have generated a different or distinct backoff time, some of which will be for a relatively greater period of time or a relatively lesser period of time, and presumably one of which will be for the smallest period of delay time. As indicated in FIG. 8, in one variation of the preferred embodiment, step 414, if the backoff time is greater than a predetermined upper bound, then that station will no longer contend during that episode of general contention resolution and will not retransmit its GPoll response, but will rather wait for another GPoll before responding, i.e., will wait for another episode of general contention access, step 415. The upper bound may be chosen to be the appropriate amount of time for transmission of a response to the GPoll-CR and the receipt of a concomitant SPoll, to avoid potential additional collisions at a later and undesirable time. If the backoff time is less than the upper bound, then it will wait that amount of time, step 416, and then retransmit its GPoll response, step 404, and again wait for an SPoll, step 406. This procedure will continue until the general contending secondary station has, in fact, gained access to the network as an active or idle secondary station.

As another contention variation not shown in FIG. 8, the various general contending secondary stations may simply wait the corresponding backoff times, and at each such time, the secondary station will transmit its response. Presumably, the primary station will respond to the first such response transmitted to it by the corresponding secondary stations, allow that secondary station to have active or idle status, and have the remaining general contending stations contend again in a next or subsequent episode of general contention procedures.

As discussed above, only unresponsive secondary stations that had just responded to a GPoll may then respond to a GPoll-CR. The polling controller in the primary station will continue to wait for and process all valid and invalid responses in the manner described above, until no further or additional responses are received after a predetermined period of time (or "timeout"). The polling controller will then inform the contention access controller that no more secondary stations are responding or have responded. The contention access controller may then command the polling controller at this time to initiate additional general contention access procedures, initiate limited contention access procedures, or to initiate specific polling procedures. In this manner, the polling controller may be dynamically responsive to the network load, providing varying repetitions, iterations or frequencies of general contention access procedures, limited contention access procedures, or specific polling procedures, to meet the possibly varying requirements of the network. For example, during periods in which many secondary stations may be powered up in order to access the network in an active or idle state, the contention access controller may institute general contention procedures relatively more frequently and repeatedly, compared to periods of lesser general contention demand.

Figure 9:
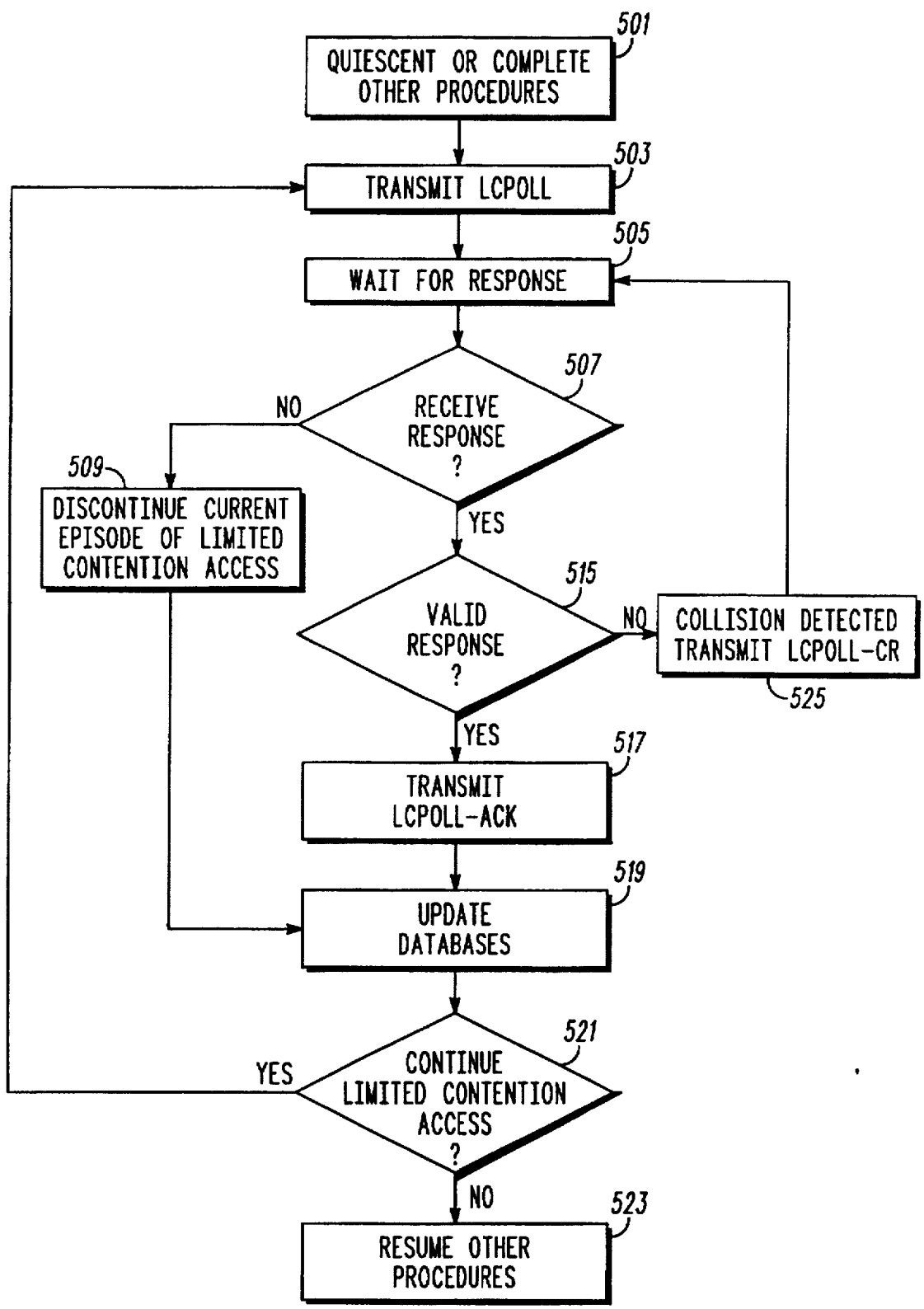
FIG. 9 is a flow chart illustrating the limited contention access procedures for a primary station of a preferred embodiment of the present invention.

FIG. 9 is a flow chart illustrating limited contention access procedures for a primary station of a preferred embodiment of the present invention. As shown in FIG. 9, after completion of other procedures or beginning in a quiescent state, step 501, the primary station may initiate limited contention polling procedures and transmit a limited contention poll, referred to or abbreviated as "LCPoll", step 503. The limited contention poll also may be comprised of any predetermined, known or otherwise defined sequence or grouping of bits, bytes, words or data packet, which is recognizable by a secondary station as the defined or known sequence forming the limited contention poll. The limited contention poll initiates limited contention procedures for the one or more of the plurality of idle secondary stations which are addressed or identified in the limited contention poll. For example, an LCPoll may contain addresses of eight, ten, or any predetermined number of idle secondary stations, such that only those eight, ten, or predetermined number of identified secondary stations may respond to that LCPoll. There may be other LCPolls in other iterations or episodes of limited contention which identify idle secondary stations other than those identified in the previous LCPoll, such that all idle stations may eventually receive an LCPoll identifying them during one iteration or another. In contrast, a general poll does not identify any unresponsive secondary stations, and any and all unresponsive stations may respond to a general poll. Also in contrast, a specific poll identifies a particular one of the plurality of active secondary stations, and no active secondary station other than the one so identified may respond to that specific poll. The limited contention poll may be considered to be some type of intermediate poll, combining aspects of both specific and general polls, providing an identification or specification of a plurality of idle secondary stations which may respond to the LCPoll (similar to an SPoll), yet allowing more than one secondary station to respond to the LCPoll (similar to a GPoll).

Referring to FIG. 9, having transmitted an LCPoll in step 503, the polling controller will then wait for a response from any of the identified idle secondary stations, step 505. Any of the plurality of idle secondary stations which receive an LCPoll containing its identification or address, will transmit information, such as application data, if any is available for transmission. If the idle secondary station does not have data available for transmission, it may ignore the LCPoll. As in the case for a response to a specific poll, the amount of information which may be transmitted in response to an LCPoll may be determined by other means. Having waited for a response from the idle secondary stations identified in the LCPoll (step 505), the polling controller will determine if it has received information, such as a response, within a predetermined period of time, step 507. If the polling controller has not received information or a response of some kind within that time period, it will "timeout" and end that particular limited contention access process for the idle secondary stations identified in that LCPoll, step 509, and inform the contention access controller. The contention access controller may, for example, update any databases as may be indicated by the lack of response, step 519, and may commence limited contention polling of other idle secondary stations, step 521, or may become quiescent or resume other specific polling or general access procedures, step 523.

Each idle secondary station which responded to the LCPoll will then wait to receive, on the downstream channel, a limited contention poll acknowledgement response, referred to or abbreviated as "LCPoll Ack", containing its address as an indication from the primary station that its response to the LCPoll was received correctly. Correspondingly, the primary station determines if it has received information from an identified idle secondary station, step 507 of FIG. 9, and, if it has received information, the primary station determines if the information was a valid response containing application data, step 515 of FIG. 9. Continuing to refer to FIG. 9, if a valid response was received following transmission of a LCPoll, then the polling controller will transmit a limited contention poll acknowledgement to that secondary station confirming that the response was received correctly, step 517. The polling controller will inform the contention access controller of the valid response, and the contention access controller may add the secondary device to the active database and remove it from the idle database, or may maintain it in the idle database, depending upon network activity and load conditions, step 519. The polling controller may then continue with limited contention procedures for other idle secondary stations, step 521, or become quiescent or resume other specific polling or general access procedures, step 523.

Continuing to refer to FIG. 9, step 515, if an invalid response is received by the primary station following transmission of a LCPoll, then it may be assumed that more that one secondary station transmitted a response to the LCPoll and that a data or response collision may have occurred or resulted, and the primary station will then transmit a limited contention poll for collision resolution, abbreviated or referred to herein as a "LCPoll-CR", step 525. The limited contention collision resolution procedures are discussed in more detail below with regard to FIG. 10. Continuing to refer to FIG. 9, however, once the primary station has transmitted a LCPoll-CR, the primary station will wait for a response to the LCPoll-CR, returning to step 505. Again, as discussed above, the primary station will determine both if it has received a response, step 507, and if it has received a valid response, step 515, and if so, continuing with step 517 to transmit an LCPoll Ack, step 519 to update databases, and steps 521 and 523 to continue limited contention or other polling procedures.

If application data is transmitted in response to an LCPoll, the transmitting secondary station will wait for an acknowledgement response, referred to as a LCPoll Ack, from the primary station after completing transmission of the application data on the upstream channel. Not shown in FIG. 9, frames containing application data transmitted on the upstream channel in response to an LCPoll may also contain a frame count information element. The frame count information element may be incremented for every frame sent in response to an LCPoll. If the primary station receives a valid response on the upstream channel from a secondary station in response to a LCPoll, it will transmit an LCPoll Ack to the identified idle secondary station, on the downstream channel, to acknowledge successful receipt of the frame. The primary station may also compare the frame count information element contained in the received frame with that of the last frame received from that identified secondary station. If the frame counts are the same, then the frame will be discarded. This aspect of the procedure is to account for the potential of an LCPoll Ack becoming corrupted during transmission on the downstream channel. Such an occurence would prevent a secondary station from gaining knowledge that the frame it previously transmitted on the upstream channel in response to the LCPoll was received correctly. The secondary station would then retransmit the same frame in response to a subsequent LCPoll. A secondary station that receives a LCPoll Ack containing its address, identification or other address that it recognizes, following transmission of application data in response to a LCPoll, will then assume its upstream transmission was received correctly and will then wait for another LCPoll or SPoll.

Figure 10:
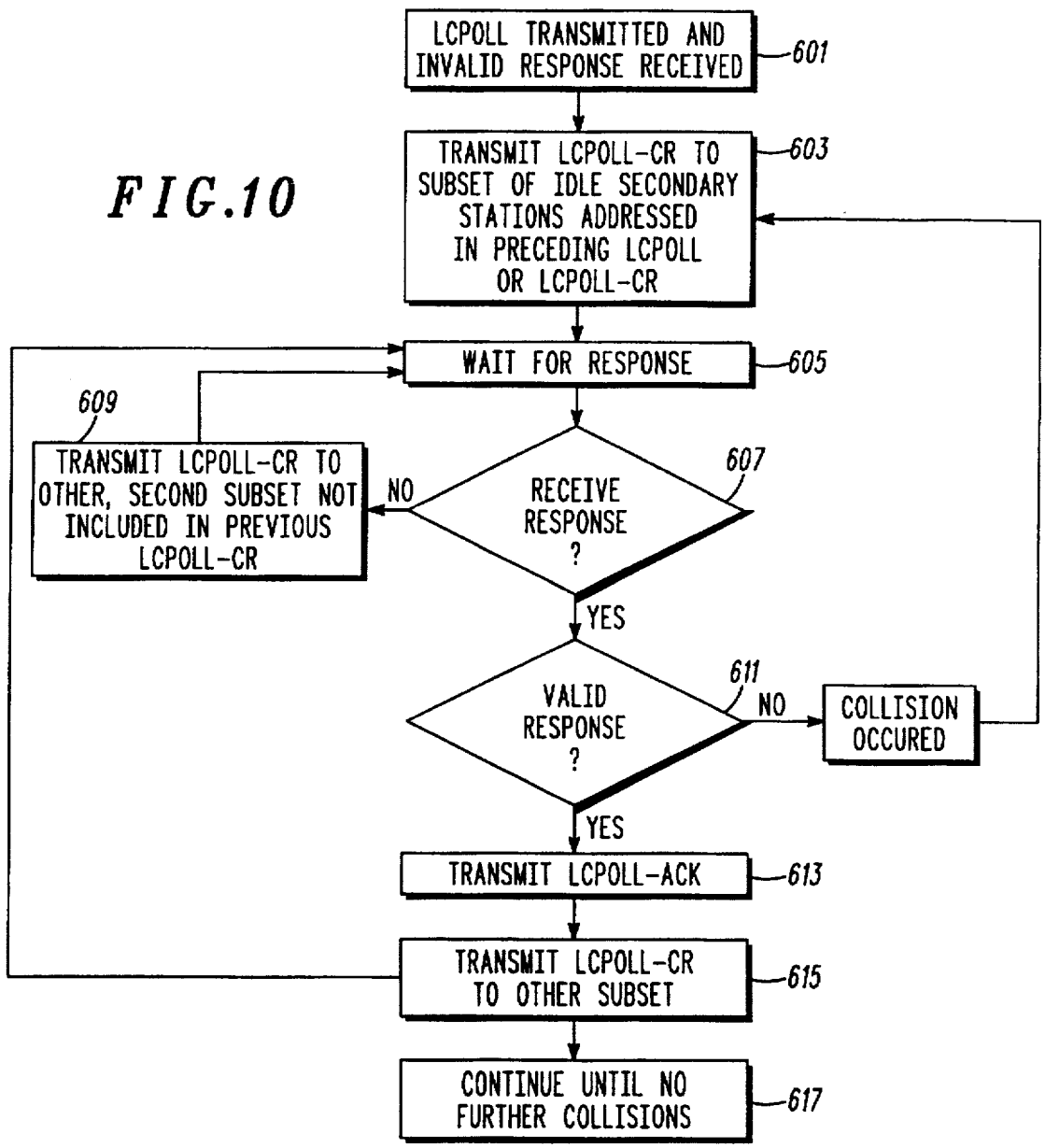
FIG. 10 is a flow chart illustrating the limited contention collision resolution procedures for a secondary station of a preferred embodiment of the present invention.

FIG. 10 is a flow diagram illustrating the limited contention collision resolution procedures of a primary station of the preferred embodiment of the present invention. Referring to FIG. 10 and as indicated previously, if the primary station had received an invalid response on the upstream channel after transmitting a LCPoll on the downstream channel, it will assume that more than one secondary station transmitted a response to that LCPoll, resulting in a collision, step 601. In this case, the primary station will transmit another type of poll referred to as a limited contention poll with or for collision resolution, or LCPoll-CR. The LCPoll-CR will be transmitted on the downstream channel containing addresses for a portion or subset of the secondary stations addressed in the previous LCPoll, step 603. In other respects, the LCPoll-CR is similar to the LCPoll. The subset of idle secondary stations, applying a binary approach, for example, may contain addresses for approximately one half of those idle secondary stations previously addressed or contained in the immediately preceding LCPoll (or LCPoll-CR), as shown in step 603. The primary station will then wait for a response to the LCPoll-CR, step 605. A secondary station which responded to an LCPoll but did not receive a LCPoll Ack, and then which receives an LCPoll-CR containing its address, will retransmit the application data transmitted in response to the previous LCPoll. The frame count information elements will be the same as those in the response to the previous LCPoll. The secondary station will then wait for a LCPoll Ack in response to to the retransmission. Upon receiving a LCPoll-CR, a secondary station which did not transmit application in response to the previous LCPoll is not permitted to transmit data until the next LCPoll is received.

The primary station will remove the address of each secondary station from which a valid response has been received following transmission of a LCPoll or LCPoll-CR. LC Ack frames will be transmitted to the secondary stations as valid responses are received. The primary station will continue to transmit LCPoll-CR frames with successively smaller subsets of secondary addresses, e. repeatedly reducing by one half the number of addresses of those contained in the previous LCPoll-CR, until there is no response received following transmission of an LCPoll-CR containing the full set of addresses contained in the previous LCPoll. The primary station assumes then that all secondary stations which had application data available for transmission when the previous LCPoll was transmitted have successfully transmitted their application data to the primary station. The polling controller in the primary station will then inform the contention access controller that it has completed limited contention procedures and will further inform the contention access controller as to which secondary devices transmitted application data during the limited contention procedures. The contention access controller may then command the polling controller to initiate polling procedures to service active secondary stations, initiate general contention procedures to attempt to establish communication with unresponsive secondary stations, or initiate additional limited contention procedures.

Continuing to refer to FIG. 10, having sent an LCPoll-CR, step 603, the primary station will wait for a response, step 605. If it has not received a response, step 607, the primary station will determine if additional polling is needed, step 609. For example, it may assume that the previously responding idle station were in the other portion or subset of the idle stations which were not addressed in the preceding LCPoll-CR and, accordingly, will transmit another LCPoll-CR to those idle stations, step 611. Alternatively, the primary station may have exhausted the process, such that no further idle stations need to be polled to resolve collisions, and may resume other polling activities, step 613. If a response had been received in step 607, the primary station will determine if a valid response, such as applications data, has been received, step 615. If a valid response was not received in step 615, a collision is assumed to have occurred, and the process returns to step 603, to transmit another LCPoll-CR to yet another smaller portion or subset of idle secondary stations previously addressed in the preceding LCPoll or LCPoll-CR. If a valid response was received, the primary station transmits an LCPoll Ack, step 617. The primary station then transmits an LCPoll-CR to the other subset of idle stations which had been addressed in the preceding LCPoll or LCPoll-CR which had resulted in a collision but which were not included in the subset of the immediately preceding LCPoll-CR., step 619. The process continues or iterates until no further collisions have occurred, step 621.

By monitoring the number of secondary stations in the active, idle, and unresponsive data bases, the contention access controller will dynamically determine how often to initiate general contention procedures to attempt to establish communications with unresponsive secondary stations, how often to initiate limited contention procedures to service idle secondary stations, and how many idle secondary stations to address during the limited contention procedures. The contention access controller coordinates these activities in order to optimize the transmission performance of the upstream channel or channels. The contention access controller will also decide when to transfer a secondary station from the active database to the idle database, and from the idle database to the active database, in order to ensure that all secondary stations are serviced with sufficient frequency to satisfy their upstream data transmission requirements. Various optimization methods and procedures may be employed by the contention access controller for determining the frequency of the various polling and contention procedures described herein, and when to transfer secondary stations from one database to another, depending upon network activity, demands and load.

Accordingly, as shown in FIGS. 1–10, there is disclosed a method of controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, the specific poll containing an identification of the first secondary station of the plurality of secondary stations in an active state;

(b) the primary station receiving information, in response to the specific poll, from the first secondary station in an active state identified in the specific poll;

(c) transmitting a limited contention poll from the primary station to a plurality of secondary stations in an idle state, the limited contention poll containing an identification of at least one of the plurality of secondary stations in an idle state;

(d) providing network access to a second secondary station of the plurality of secondary stations in an idle state by the primary station receiving information, in response to the limited contention poll, from the second secondary station in an idle state identified in the limited contention poll and transmitting a limited contention poll acknowledgment to the second identified secondary station;

(e) transmitting a general contention poll from the primary station to at least one of the plurality of secondary stations in an unresponsive state;

(f) receiving information from any of the plurality of secondary stations in an unresponsive state in response to the general contention poll;

(g) determining whether the information received in step (f), in response to the general contention poll, is a transfer request from a third identified secondary station in an unresponsive state to transfer to a responsive state, and in the event that the information received is a transfer request from a third identified secondary station, transferring the third identified secondary station in an unresponsive state, to a responsive state, and providing network access to the transferred, third identified secondary station;

(h) dynamically determining the relative frequencies of repetition of steps (a) and (b), steps (c) and (d), and steps (e) through (g), inclusive; and (i) repeating steps (a) and (b), steps (c) and (d), and steps (e) through (g), inclusive, in relative proportion to the dynamically determined relative frequencies.

The preferred embodiment of the method of the present invention may also include:

(1) determining whether the information received by the primary station in response to the limited contention poll is collision information.

(2) transmitting a first limited contention poll for collision resolution from the primary station to a first subset of the plurality of secondary stations in an idle state which had been identified in the preceding limited contention poll;

(3) receiving information from at least one of the secondary stations of the first subset of the plurality of secondary stations in an idle state in response to the first limited contention poll for collision resolution;

(4) determining whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station;

(5) determining whether the information received by the primary station in response to an immediately preceding limited contention poll for collision resolution is further collision information;

(6) transmitting a successive limited contention poll for collision resolution from the primary station, in response to further collision information, to a successive subset of the plurality of secondary stations in an idle state which had been identified in the immediately preceding limited contention poll for collision resolution;

(7) receiving information from at least one of the secondary stations of the successive subset of the plurality of secondary stations in an idle state in response to the successive limited contention poll for collision resolution; and (8) determining whether the information received in response to the successive limited contention poll for collision resolution is a valid response from a fifth identified secondary station in an idle state, and in the event that the information received is a valid response from a fifth identified secondary station, transmitting a limited contention poll acknowledgment to the fifth identified secondary station and providing network access to the fifth identified secondary station;

(9) repeating steps (5) through (8), inclusive, until no further collision information has been received by the primary station in response to a successive limited contention poll for collision resolution;

(10) transmitting a second limited contention poll for collision resolution from the primary station to a second subset of the plurality of secondary stations in an idle state which had been identified in the limited contention poll and which had not been identified in the first limited contention poll for collision resolution from the primary station to the first subset of the plurality of secondary stations in an idle state;

(11) receiving information from at least one of the secondary stations of the second subset of the plurality of secondary stations in an idle state in response to the second limited contention poll for collision resolution;

(12) determining whether the information received in response to the second limited contention poll for collision resolution is a valid response from a sixth identified secondary station in an idle state, and in the event that the information received is a valid response from a sixth identified secondary station, transmitting a limited contention poll acknowledgment to the sixth identified secondary station and providing network access to the sixth identified secondary station;

(13) determining whether the information received by the primary station in response to an immediately preceding limited contention poll for collision resolution is further collision information;

(14) transmitting a successive limited contention poll for collision resolution from the primary station, in response to further collision information, to a successive subset of the plurality of secondary stations in an idle state which had been identified in the immediately preceding limited contention poll for collision resolution;

(15) receiving information from at least one of the secondary stations of the successive subset of the plurality of secondary stations in an idle state in response to the successive limited contention poll for collision resolution;

(16) determining whether the information received in response to the successive limited contention poll for collision resolution is a valid response from a seventh identified secondary station in an idle state, and in the event that the information received is a valid response from a seventh identified secondary station, transmitting a limited contention poll acknowledgment to the seventh identified secondary station and providing network access to the seventh identified secondary station; and

(17) repeating steps (13) through (16), inclusive, until no further collision information has been received by the primary station in response to a successive limited contention poll for collision resolution.

In addition, in the preferred embodiment, the successive subset may be smaller than the immediately preceding subset; may contain fewer addresses of secondary stations in an idle state than the immediately preceding subset; or may contain one half of the addresses of secondary stations which had been contained in the immediately preceding subset. The preferred embodiment may also include: dynamically determining the relative frequencies of transmission of specific polls, limited contention polls, and general contention polls by increasing the relative frequency of transmission of specific polls in response to increasing network data transmission to the primary station; dynamically determining the relative frequencies of transmission of specific polls, limited contention polls, and general contention polls by increasing the relative frequency of transmission of general polls in response to decreasing network data transmission to the primary station; dynamically determining the relative frequencies of transmission of specific polls, limited contention polls, and general contention polls by increasing the relative frequency of transmission of general polls in response to an increasing frequency of collision information received in response to a plurality of general polls; and dynamically determining the relative frequencies of transmission of specific polls, limited contention polls, and general contention polls by increasing the frequency of specific polls in response to an increasing frequency of collision information received in response to a plurality of limited contention polls.

The preferred embodiment may also include additional steps:

(j) maintaining a first database of addresses of the plurality of secondary stations which may be in an active state;

(k) maintaining a second database of addresses of the plurality of secondary stations which may be in an idle state; and (l) maintaining a third database of addresses of the plurality of secondary stations which may be in an unresponsive state; and (m) revising the first database, the second database and the third database in response to the information received in response to the specific poll; in response to the limited contention poll, or in response to the general contention poll.

The general contention access aspects of the preferred embodiment may also include:

determining whether the information received by the primary station in response to the general poll is collision information;

transmitting a general poll for collision resolution from the primary station to at least one of the plurality of secondary stations in an unresponsive state, in the event that the information received by the primary station in response to the general poll is collision information;

receiving information from at least one of the plurality of secondary stations in an unresponsive state which had responded to the preceding general poll of step (f); and determining whether the information received in response to the general poll for collision resolution is a request from a fourth identified secondary station in an unresponsive state to transfer to a responsive state, and in the event that the information received is the transfer request from a fourth identified secondary station, transferring the fourth identified secondary stations in an unresponsive state, to a responsive state, and providing network access to the transferred, fourth identified secondary station.

Also as discussed in detail above, the various collision resolution procedures of the preferred embodiment of the present invention may include delaying a transmission of information, in response to the general poll for collision resolution, from at least one of the plurality of secondary stations which had responded to the preceding general poll, for a period of time. The period of time may be determined randomly, may be determined randomly between an upper limit and a lower limit, or may be determined by the period of time to transmit a data packet/frame.

The preferred embodiment may also include determining whether the information received in response to a specific poll constitutes no response information, transferring a secondary station, from which no response information was received repeatedly in response to sequential specific polls identifying the secondary station, from an active state to an unresponsive state; and revising the first database and the second database in response to the no response information received in response to the specific poll. In addition, the preferred embodiment of the present invention includes determining which of the plurality of secondary stations are in an active state by accessing the first database; which of the plurality of secondary stations are in an idle state by accessing the third database; determining whether the information received in response to a specific poll is a frame of data; determining whether the information received in response to the specific poll is a negative acknowledgement; and determining whether the information received by the primary station in response to the general poll is no response information.

Other embodiments of the present invention may include singular rather than plural databases, such that the method of the present invention includes maintaining a database containing addresses of the plurality of secondary stations, the database further containing data identifying which of the plurality of secondary stations may be in an unresponsive state, which of the plurality of secondary stations may be in an idle state, and which of the plurality of secondary stations may be in an active state; and revising the database in response to information received in response to any of a plurality of polls transmitted by the primary station.

In another variation of the invention described herein, a frequency division or channel approach may be employed rather than a time division approach discussed above in reference to FIGS. 1–10, or in combination with a time division approach. Referring to FIG. 1, the downstream channel 18 and the upstream channel 20 may be physically combined, for example, as one coaxial cable or twisted pair. Each such physical transmission line may have a transmission bandwidth, which may be comprised of a plurality of communications channels (also referred to as "channels"), each having a predetermined bandwidth at non-overlapping frequencies. For example, a first such channel may have a 3 kHz bandwidth in a first frequency range or band from 3 kHz to 6 kHz, a second channel may also have a 3 kHz bandwidth in a second frequency range or band from 6 kHz to 9 kHz, a third channel may also have a 3 kHz bandwidth in a third frequency range or band from 9 kHz to 12 kHz, and so on. In this manner, the communications medium may be comprised of a plurality of downstream and upstream communications channels, each of which may have a predetermined bandwidth in a predetermined frequency range or band.

In an embodiment of the invention, for example, the plurality of channels for the upstream direction may have an approximate bandwidth of 600 kHz, throughout the 5 to 42 MHz frequency range, approximately, of the electromagnetic communications spectrum. In addition, planning for an asymmetric data communications model having possibly greater data transmission in the downstream direction, the plurality of downstream communications channels may each have a 6 MHz bandwidth, throughout the 50 to 750 MHz frequency range, approximately.

Figure 11:
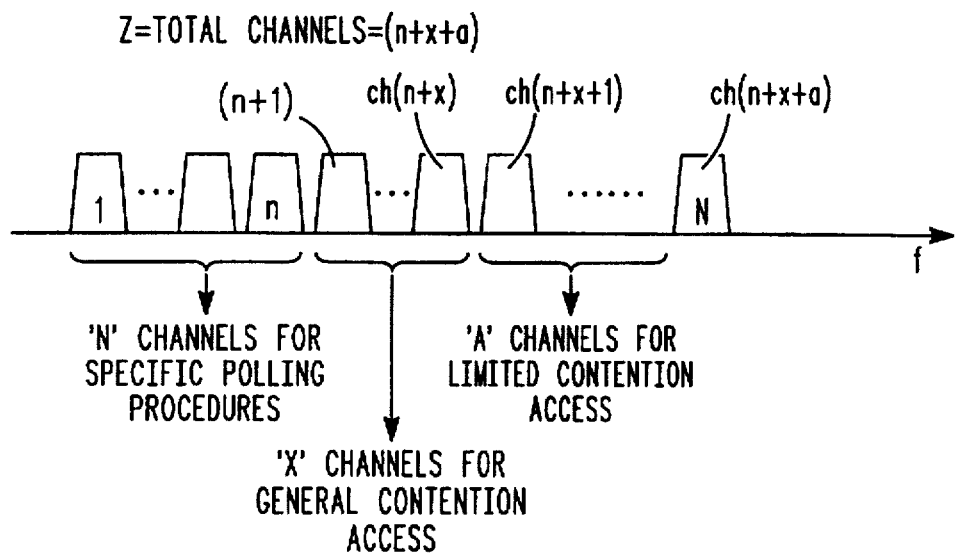
FIG. 11 is a schematic diagram illustrating a plurality of frequency channels comprising the available bandwidth of the entire transmission line.

In accordance with the invention described herein, each such frequency channel may be employed for specific polling procedures, for limited contention access procedures, for general contention access procedures, or for any combination of specific polling, limited contention access and general contention access procedures. In addition, each such channel may also employ such time division procedures discussed above. FIG. 11 is a schematic diagram illustrating a plurality of frequency channels comprising the available bandwidth of the entire transmission line. Referring to FIG. 11, the transmission line is divided into a plurality of (z) total frequency channels (where (n+x+a)=z). As shown in FIG. 11, there may be (n) channels dedicated for specific polling procedures, (x) channels dedicated for general contention access procedures, and (a) channels dedicated for limited contention access procedures. Similarly, the proportion or percentage of such channels allocated for specific polling, limited contention access, or for general contention access may be varied responsively to network demands or otherwise varied dynamically in response to the potentially changing transmission requirements of the network.

Figure 12:
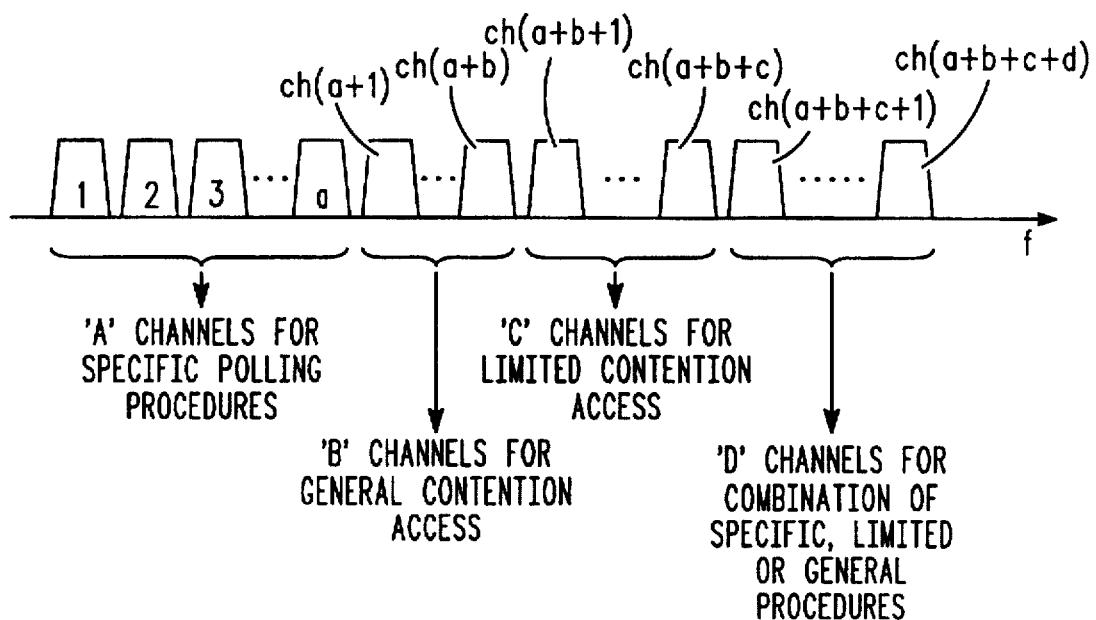
FIG. 12 is a schematic diagram illustrating a plurality of frequency channels comprising the available bandwidth of the entire transmission line, in conjunction with various time division procedures.

FIG. 12 is a schematic diagram illustrating a plurality of "z" frequency channels comprising the available bandwidth of the entire transmission line, in conjunction with the various time division procedures discussed in detail above (where (a+b+c+d)=z). As shown in FIG. 12, there may be (a) channels dedicated for specific polling procedures, and (b) channels dedicated for general contention access procedures, (c) channels dedicated for limited contention access procedures, and (d) channels in which any combination of specific polling, limited contention access, and general contention access procedures may be employed. Similarly, the proportion or percentage of such channels allocated for specific polling, for limited contention access, for general contention access, or for combined limited contention access, general contention access and specific polling, may be varied responsively to network demands or otherwise varied dynamically in response to the potentially changing transmission requirements of the network.

As shown in FIGS. 1–12, the various embodiments of the present invention include a method of controlling access to a network for information transmission and reception, the network having a primary station coupleable to a plurality of secondary stations via a communications medium, the communications medium having a plurality of communications channels, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, on a first communications channel of the plurality of communications channels, the specific poll containing an identification of the first secondary station of the plurality of secondary stations in an active state;

(b) the primary station receiving information on a second communications channel of the plurality of communications channels, in response to the specific poll, from the first secondary station in an active state identified in the specific poll;

(c) transmitting a limited contention poll from the primary station, on a third communications channel of the plurality of communications channels, to a plurality of secondary stations in an idle state, the limited contention poll containing an identification of at least one of the plurality of secondary stations in an idle state;

(d) providing network access to a second secondary station of the plurality of secondary stations in an idle state by the primary station receiving information on a fourth communications channel of the plurality of communications channels, in response to the limited contention poll, from the second secondary station in an idle state identified in the limited contention poll and transmitting a limited contention poll acknowledgment to the second identified secondary station;

(e) transmitting a general contention poll from the primary station, on a fifth communications channel of the plurality of communications channels, to at least one of the plurality of secondary stations in an unresponsive state;

(f) receiving information, on a sixth communications channel of the plurality of communications channels, from any of the plurality of secondary stations in an unresponsive state in response to the general contention poll;

(g) determining whether the information received in step (f), in response to the general contention poll, is a transfer request from a third identified secondary station in an unresponsive state to transfer to a responsive state, and in the event that the information received is a transfer request from a third identified secondary station, transferring the third identified secondary station in an unresponsive state, to a responsive state, and providing network access to the transferred, third identified secondary station on at least one of the plurality of communications channels;

(h) dynamically determining the relative frequencies of repetition of steps (a) and (b), steps (c) and (d), and steps (e) through (g), inclusive; and (i) repeating steps (a) and (b), steps (c) and (d), and steps (e) through (g), inclusive, in relative proportion to the dynamically determined relative frequencies.

In the interests of brevity, other features of this embodiment of the present invention which may be the same as or similar to those previously mentioned have not been repeated herein, such as collision resolution procedures, means of optimizing network performance, database structure, database revision in response to the various polls available, delaying and determining the delay time of secondary stations in the collision resolution process, changing a secondary station from an active status to an unresponsive status in response to repeatedly receiving no response information, and the various other features and advantages previously discussed. Many of these features are noted in the various claims herein, and are incorporated by reference in this detailed description.

Various features of the apparatus embodiments may also be described in detail. For example, an apparatus for controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, each of the plurality of secondary stations further having a distinct address, the primary station having a receiver coupleable to the communications channel for the reception of information from the plurality of secondary stations, the primary station further having a transmitter coupleable to the communications channel for the transmission of information to the plurality of secondary stations; the network access controlling apparatus comprising:

a first memory storing a first database, the first database containing the addresses of a plurality of secondary stations in an active state;

a second memory storing a second database, the second database containing the addresses of a plurality of secondary stations in an idle state;

a third memory storing a third database, the third database containing the addresses of a plurality of secondary stations in an unresponsive state; and a controller, the controller coupled to the first memory, to the second memory and to the third memory, the controller coupleable to the receiver and to the transmitter, the controller providing network access to a first secondary station of the plurality of secondary stations in an active state by transmitting a specific poll, the specific poll containing an identification address of the first secondary station of the plurality of secondary stations in an active state, and by receiving information, in response to the specific poll, from the first secondary stations in an active state identified in the specific poll; the controller providing network access to a second secondary station of the plurality of secondary stations in an idle state by transmitting a limited contention poll to a plurality of secondary stations in an idle state, the limited contention poll containing an identification of at least one of the plurality of secondary stations in an idle state, by receiving information, in response to the limited contention poll, from the second secondary station in an idle state identified in the limited contention poll and transmitting a limited contention poll acknowledgment to the second identified secondary station; the controller further providing network access to a third secondary station of the plurality of secondary stations in an unresponsive state by transmitting a general poll to at least one of the plurality of secondary stations in an unresponsive state, by receiving information from any of the plurality of secondary stations in an unresponsive state in response to the general poll, by determining whether the information received, in response to the general poll, is a transfer request from a third identified secondary station in an unresponsive state to transfer to a responsive state, and in response to a transfer request from a third identified secondary station, the controller transferring the third identified secondary stations in an unresponsive state, to a responsive state; the controller further responsive to the information received to dynamically determine the relative frequencies of transmission of a plurality of specific polls, transmission of a plurality of limited contention polls, and transmission of a plurality of general contention polls, the controller further responsive to transmit a plurality of specific polls, limited contention polls and general polls in relative proportion to the dynamically determined relative frequencies.

As discussed above, the controller of the preferred apparatus embodiment of the present invention may be embodied in a variety of forms. For example, the controller may be a microcontroller, a processor, a microprocessor, or may be part of a larger device such as a computer, a workstation, a personal computer, etc. In addition, the apparatus may be distributed among a variety of physically separate devices. For example, the apparatus may be wholly contained within the primary station itself, may be partially contained within the primary station and various accessory devices, and may also be distributed into aspects of the secondary station. The time delay circuit discussed herein, for example, may be embodied as hardware, firmware, or software, and may be included as part of the hardware and programming of a secondary station.

As mentioned above with regard to the method aspects of the various embodiments of the present invention, the memory circuitry may also have a variety of forms, and may be separate, distributed, or combined with other elements and features. For example, the first memory having the first database and the second memory having the second database may, in fact, be part of one memory circuit. The memory aspects of the apparatus may also be embodied in various forms, such as RAM, ROM, EPROM, in discrete components, as an integrated circuit, or as part of a larger integrated circuit such as a microprocessor.

The preferred embodiment of the apparatus may also include having the controller be further responsive to:

(a) determine whether the information received by the primary station in response to the limited contention poll is collision information;

(b) transmit a first limited contention poll for collision resolution from the primary station to a first subset of the plurality of secondary stations in an idle state which had been identified in the preceding limited contention poll; receive information from at least one of the secondary stations of the first subset of the plurality of secondary stations in an idle state in response to the first limited contention poll for collision resolution; and determine whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station;

(d) determine whether the information received by in response to an immediately preceding limited contention poll for collision resolution is further collision information;

(e) transmit a successive limited contention poll for collision resolution, in response to further collision information, to a successive subset of the plurality of secondary stations in an idle state which had been identified in the immediately preceding limited contention poll for collision resolution; receive information from at least one of the secondary stations of the successive subset of the plurality of secondary stations in an idle state in response to the successive limited contention poll for collision resolution; and determine whether the information received in response to the successive limited contention poll for collision resolution is a valid response from a fifth identified secondary station in an idle state, and in the event that the information received is a valid response from a fifth identified secondary station, transmit a limited contention poll acknowledgment to the fifth identified secondary station and providing network access to the fifth identified secondary station;

(f) repeat the procedures of transmitting, receiving and determining, until no further collision information has been received in response to a successive limited contention poll for collision resolution;

(g) transmit a second limited contention poll for collision resolution to a second subset of the plurality of secondary stations in an idle state which had been identified in the limited contention poll and which had not been identified in the first limited contention poll for collision resolution to the first subset of the plurality of secondary stations in an idle state; receive information from at least one of the secondary stations of the second subset of the plurality of secondary stations in an idle state in response to the second limited contention poll for collision resolution; and determine whether the information received in response to the second limited contention poll for collision resolution is a valid response from a sixth identified secondary station in an idle state, and in the event that the information received is a valid response from a sixth identified secondary station, transmit a limited contention poll acknowledgment to the sixth identified secondary station and providing network access to the sixth identified secondary station;

(h) determine whether the information received in response to an immediately preceding limited contention poll for collision resolution is further collision information;

(i) transmit a successive limited contention poll for collision resolution from the primary station, in response to further collision information, to a successive subset of the plurality of secondary stations in an idle state which had been identified in the immediately preceding limited contention poll for collision resolution; receive information from at least one of the secondary stations of the successive subset of the plurality of secondary stations in an idle state in response to the successive limited contention poll for collision resolution; and determine whether the information received in response to the successive limited contention poll for collision resolution is a valid response from a seventh identified secondary station in an idle state, and in the event that the information received is a valid response from a seventh identified secondary station, transmit a limited contention poll acknowledgment to the seventh identified secondary station and provide network access to the seventh identified secondary station;

(j) continue to transmit a successive limited contention poll for collision resolution from the primary station, in response to further collision information, to a successive subset of the plurality of secondary stations in an idle state which had been identified in the immediately preceding limited contention poll for collision resolution; continue to receive information from at least one of the secondary stations of the successive subset of the plurality of secondary stations in an idle state in response to the successive limited contention poll for collision resolution; and continue to determine whether the information received in response to the successive limited contention poll for collision resolution is a valid response from a seventh identified secondary station in an idle state, and in the event that the information received is a valid response from a seventh identified secondary station, transmit a limited contention poll acknowledgment to the seventh identified secondary station and provide network access to the seventh identified secondary station; until no further collision information has been received in response to a successive limited contention poll for collision resolution;

(k) revise the first database, the second database and the third database in response to the information received in response to the specific poll, the limited contention poll, and the general contention poll;

(l) dynamically determine the relative frequencies of transmission of specific polls, limited contention polls, and general contention polls by: increasing the relative frequency of transmission of specific polls in response to increasing network data transmission to the primary station; increasing the relative frequency of transmission of general polls in response to decreasing network data transmission to the primary station; increasing the relative frequency of transmission of general polls in response to an increasing frequency of collision information received in response to a plurality of general polls; increasing the frequency of specific polls in response to an increasing frequency of collision information received in response to a plurality of limited contention polls; or changing the relative proportion of a plurality of communications channels allocated for the transmission of specific polls, limited contention polls, and general contention polls; and (m) determine whether the information received in response to the general poll is collision information; the controller, in response to collision information, transmits a general poll for collision resolution to at least one of the plurality of secondary stations in an unresponsive state; the controller further providing network access to a fourth secondary station by receiving information from at least one of the plurality of secondary stations in an unresponsive state which had responded to the preceding general poll, and determining whether the information received in response to the general poll for collision resolution is a request from a fourth identified secondary station in an unresponsive state to transfer to a responsive state, and in response to the transfer request from a fourth identified secondary station, the controller transferring the fourth identified secondary station in an unresponsive state, to a responsive state.

The preferred embodiment may also include a time delay circuit, the time delay circuit delaying a transmission of information, in response to the general poll for collision resolution, from at least one of the plurality of secondary stations which had responded to the preceding general poll, for a period of time. The time delay circuit may randomly determine the period of time, may randomly determine the period of time between an upper limit and a lower limit, or may determine the period of time based upon the period of time to transmit a data packet/frame.

The controller may also be configured to perform any of the various features previously discussed. For example, the controller, in response to the information received in response to the specific poll, determines whether the information received is no response information. The controller further, in response to repeatedly receiving no response information in response to sequential specific polls identifying a secondary station, transfers the secondary station from an active state to an unresponsive state, and revises the first database and the second database in response to the no response information received in response to the specific poll. The controller may also further determine whether the information received in response to the specific poll is a frame of data, whether the information received in response to the specific poll is a negative acknowledgement, and whether the information received in response to the general poll is no response information.

In summary, the preferred embodiment of the present invention may include a method of controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, the specific poll containing an identification of the first secondary station of the plurality of secondary stations in an active state;

(b) the primary station receiving information, in response to the specific poll, from the first secondary station in an active state identified in the specific poll;

(c) transmitting a limited contention poll from the primary station to a plurality of secondary stations in an idle state, the limited contention poll containing an identification of at least one of the plurality of secondary stations in an idle state;

(d) the primary station receiving information, in response to the limited contention poll, from a second secondary station in an idle state identified in the limited contention poll;

(e) determining if the information received in response to the limited contention poll is a valid response, and if the information received in response to the limited contention poll is a valid response, transmitting a limited contention poll acknowledgment to the second identified secondary station and providing network access to the second secondary station;

(f) determining if the information received by the primary station in response to the limited contention poll is collision information;

(g) transmitting a first limited contention poll for collision resolution from the primary station to a first subset of the plurality of secondary stations in an idle state which had been identified in the preceding limited contention poll;

(h) receiving information from at least one of the secondary stations of the first subset of the plurality of secondary stations in an idle state in response to the first limited contention poll for collision resolution;

(i) determining whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station;

(j) determining whether the information received by the primary station in response to an immediately preceding limited contention poll for collision resolution is further collision information;

(k) transmitting a successive limited contention poll for collision resolution from the primary station, in response to further collision information, to a successive subset of the plurality of secondary stations in an idle state which had been identified in the immediately preceding limited contention poll for collision resolution;

(l) receiving information from at least one of the secondary stations of the successive subset of the plurality of secondary stations in an idle state in response to the successive limited contention poll for collision resolution;

(m) determining whether the information received in response to the successive limited contention poll for collision resolution is a valid response from a fifth identified secondary station in an idle state, and in the event that the information received is a valid response from a fifth identified secondary station, transmitting a limited contention poll acknowledgment to the fifth identified secondary station and providing network access to the fifth identified secondary station;

(n) repeating steps (j) through (m), inclusive, until no further collision information has been received by the primary station in response to a successive limited contention poll for collision resolution;

(o) transmitting a second limited contention poll for collision resolution from the primary station to a second subset of the plurality of secondary stations in an idle state which had been identified in the limited contention poll and which had not been identified in the first limited contention poll for collision resolution from the primary station to the first subset of the plurality of secondary stations in an idle state;

(p) receiving information from at least one of the secondary stations of the second subset of the plurality of secondary stations in an idle state in response to the second limited contention poll for collision resolution; and (q) determining whether the information received in response to the second limited contention poll for collision resolution is a valid response from a sixth identified secondary station in an idle state, and in the event that the information received is a valid response from a sixth identified secondary station, transmitting a limited contention poll acknowledgment to the sixth identified secondary station and providing network access to the sixth identified secondary station;

(r) determining whether the information received by the primary station in response to an immediately preceding limited contention poll for collision resolution is further collision information;

(s) transmitting a successive limited contention poll for collision resolution from the primary station, in response to further collision information, to a successive subset of the plurality of secondary stations in an idle state which had been identified in the immediately preceding limited contention poll for collision resolution;

(t) receiving information from at least one of the secondary stations of the successive subset of the plurality of secondary stations in an idle state in response to the successive limited contention poll for collision resolution;

(u) determining whether the information received in response to the successive limited contention poll for collision resolution is a valid response from a seventh identified secondary station in an idle state, and in the event that the information received is a valid response from a seventh identified secondary station, transmitting a limited contention poll acknowledgment to the seventh identified secondary station and providing network access to the seventh identified secondary station;

(v) repeating steps (r) through (v), inclusive, until no further collision information has been received by the primary station in response to a successive limited contention poll for collision resolution;

(w) transmitting a general contention poll from the primary station to at least one of the plurality of secondary stations in an unresponsive state;

(x) receiving information from any of the plurality of secondary stations in an unresponsive state in response to the general contention poll;

(y) determining whether the information received in step (x), in response to the general contention poll, is a transfer request from an identified secondary station in an unresponsive state to transfer to a responsive state, and in the event that the information received is a transfer request from an identified secondary station, transferring the identified secondary station in an unresponsive state, to a responsive state, and providing network access to the transferred, identified secondary station;

step (g) further comprises:

(z) determining whether the information received by the primary station in step (x) in response to the general poll is collision information; transmitting a general poll for collision resolution from the primary station to at least one of the plurality of secondary stations in an unresponsive state, in the event that the information received by the primary station in response to the general poll is collision information; receiving information from at least one of the plurality of secondary stations in an unresponsive state which had responded to the preceding general poll of step (w); determining whether the information received in response to the general poll for collision resolution is a request from an identified secondary station in an unresponsive state to transfer to a responsive state, and in the event that the information received is the transfer request from an identified secondary station, transferring the identified secondary stations in an unresponsive state, to a responsive state, and providing network access to the transferred, identified secondary station;

(aa) dynamically determining the relative frequencies of repetition of specific polling procedures, limited contention access procedures, and general contention access procedures; and (bb) repeating specific polling procedures, limited contention access procedures, and general contention access procedures, in relative proportion to the dynamically determined relative frequencies.

Those skilled in the art will recognize the many advantages of the embodiments of the present invention over network protocols currently in use. First, the present invention provides improved network performance by reducing the amount of time and bandwidth expended accessing unresponsive secondary stations. Second, the present invention provides a more efficient approach for accessing unresponsive secondary stations than is available with existing protocols employing a polling discipline.

Moreover, a centrally controlled (within the primary station) contention access discipline coupled with the specific polling protocol allows for a less complex, and therefore more economical, implementation of secondary stations. Because there are usually far greater numbers of secondary stations than primary stations in computer or communications networks, the overall network implementation may be more efficient and economical. Conversely, contention access disciplines are typically implemented in a distributed fashion, where there may be no distinction between primary and secondary stations, requiring all such stations to be equally complex and presumably more expensive and less efficient.

A centrally controlled contention access discipline also allows for the relative mix of polling and contention disciplines to be dynamically altered in response to different network conditions (i.e. contention access procedures will be operating more frequently when there is a great number of unresponsive secondary stations, and less frequently as the number of unresponsive stations decreases relative to the number of active stations). In the prior art, this dynamic allocation is either not possible or highly complex with a distributed implementation.

Lastly, the centrally concentrated intelligence, via the implementation of the primary station, allows for the subsequent implementation and deployment of more complex and sophisticated algorithms employed by the contention access controller and the polling controller, without requiring upgrades to secondary stations. This provides a much more economical and efficient means for performing network upgrades and enhancements than is possible with networks where the protocol intelligence is distributed.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method of controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, the specific poll containing an identification of the first secondary station of the plurality of secondary stations in an active state;

(b) the primary station receiving information, in response to the specific poll, from the first secondary station in an active state identified in the specific poll;

(c) transmitting a limited contention poll from the primary station to a plurality of secondary stations in an idle state, the limited contention poll containing an identification of at least one of the plurality of secondary stations in an idle state;

(d) providing network access to a second secondary station of the plurality of secondary stations in an idle state by the primary station receiving information, in response to the limited contention poll, from the second secondary station in an idle state identified in the limited contention poll and transmitting a limited contention poll acknowledgment to the second identified secondary station;

(e) transmitting a general contention poll from the primary station to at least one of the plurality of secondary stations in an unresponsive state;

(f) receiving information from any of the plurality of secondary stations in an unresponsive state in response to the general contention poll;

(g) determining whether the information received in step (f), in response to the general contention poll, is a transfer request from a third identified secondary station in an unresponsive state to transfer to a responsive state, and in the event that the information received is a transfer request from a third identified secondary station, transferring the third identified secondary station in an unresponsive state, to a responsive state, and providing network access to the transferred, third identified secondary station;

(h) dynamically determining the relative frequencies of repetition of steps (a) and (b), steps (c) and (d), and steps (e) through (g), inclusive; and (i) repeating steps (a) and (b), steps (c) and (d), and steps (e) through (g), inclusive, in relative proportion to the dynamically determined relative frequencies.

2. The method of claim 1, wherein step (d) further comprises:

(d1) determining whether the information received by the primary station in response to the limited contention poll is collision information.

3. The method of claim 2, further comprising:

(d2) transmitting a first limited contention poll for collision resolution from the primary station to a first subset of the plurality of secondary stations in an idle state which had been identified in the preceding limited contention poll;

(d3) receiving information from at least one of the secondary stations of the first subset of the plurality of secondary stations in an idle state in response to the first limited contention poll for collision resolution; and (d4) determining whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station.

4. The method of claim 3, further comprising:

(d5) determining whether the information received by the primary station in response to an immediately preceding limited contention poll for collision resolution is further collision information.

5. The method of claim 4, further comprising:

(d6) transmitting a successive limited contention poll for collision resolution from the primary station, in response to further collision information, to a successive subset of the plurality of secondary stations in an idle state which had been identified in the immediately preceding limited contention poll for collision resolution;

(d7) receiving information from at least one of the secondary stations of the successive subset of the plurality of secondary stations in an idle state in response to the successive limited contention poll for collision resolution; and (d8) determining whether the information received in response to the successive limited contention poll for collision resolution is a valid response from a fifth identified secondary station in an idle state, and in the event that the information received is a valid response from a fifth identified secondary station, transmitting a limited contention poll acknowledgment to the fifth identified secondary station and providing network access to the fifth identified secondary station.

6. The method of claim 5, further comprising:

(d9) repeating steps (d5) through (d8), inclusive, until no further collision information has been received by the primary station in response to a successive limited contention poll for collision resolution.

7. The method of claim 6 wherein the successive subset is smaller than the immediately preceding subset.

8. The method of claim 6 wherein the successive subset contains fewer addresses of secondary stations in an idle state than the immediately preceding subset.

9. The method of claim 6 wherein the successive subset contains one half of the addresses of secondary stations which had been contained in the immediately preceding subset.

10. The method of claim 6, further comprising:

(d10) transmitting a second limited contention poll for collision resolution from the primary station to a second subset of the plurality of secondary stations in an idle state which had been identified in the limited contention poll and which had not been identified in the first limited contention poll for collision resolution from the primary station to the first subset of the plurality of secondary stations in an idle state;

(d11) receiving information from at least one of the secondary stations of the second subset of the plurality of secondary stations in an idle state in response to the second limited contention poll for collision resolution; and (d12) determining whether the information received in response to the second limited contention poll for collision resolution is a valid response from a sixth identified secondary station in an idle state, and in the event that the information received is a valid response from a sixth identified secondary station, transmitting a limited contention poll acknowledgment to the sixth identified secondary station and providing network access to the sixth identified secondary station.

11. The method of claim 10, further comprising:

(d13) determining whether the information received by the primary station in response to an immediately preceding limited contention poll for collision resolution is further collision information.

12. The method of claim 11, further comprising:

(d14) transmitting a successive limited contention poll for collision resolution from the primary station, in response to further collision information, to a successive subset of the plurality of secondary stations in an idle state which had been identified in the immediately preceding limited contention poll for collision resolution;

(d15) receiving information from at least one of the secondary stations of the successive subset of the plurality of secondary stations in an idle state in response to the successive limited contention poll for collision resolution; and (d16) determining whether the information received in response to the successive limited contention poll for collision resolution is a valid response from a seventh identified secondary station in an idle state, and in the event that the information received is a valid response from a seventh identified secondary station, transmitting a limited contention poll acknowledgment to the seventh identified secondary station and providing network access to the seventh identified secondary station.

13. The method of claim 12, further comprising:

(d17) repeating steps (d13) through (d16), inclusive, until no further collision information has been received by the primary station in response to a successive limited contention poll for collision resolution.

14. The method of claim 13 wherein the successive subset is smaller than the immediately preceding subset.

15. The method of claim 13 wherein the successive subset contains fewer addresses of secondary stations in an idle state than the immediately preceding subset.

16. The method of claim 13 wherein the successive subset contains one half of the addresses of secondary stations which had been contained in the immediately preceding subset.

17. The method of claim 6, further comprising:

(j) maintaining a first database of addresses of the plurality of secondary stations which may be in an active state;

(k) maintaining a second database of addresses of the plurality of secondary stations which may be in an idle state; and (l) maintaining a third database of addresses of the plurality of secondary stations which may be in an unresponsive state.

18. The method of claim 17, further comprising:

(m) revising the first database, the second database and the third database in response to the information received in response to the specific poll.

19. The method of claim 17, further comprising:

(m) revising the first database, the second database and the third database in response to the information received in response to the limited contention poll.

20. The method of claim 17, further comprising:

(m) revising the first database, the second database and the third database in response to the information received in response to the general contention poll.

21. The method of claim 1, wherein step (g) further comprises:

determining whether the information received by the primary station in response to the general poll is collision information;

transmitting a general poll for collision resolution from the primary station to at least one of the plurality of secondary stations in an unresponsive state, in the event that the information received by the primary station in response to the general poll is collision information;

receiving information from at least one of the plurality of secondary stations in an unresponsive state which had responded to the preceding general poll of step (f); and determining whether the information received in response to the general poll for collision resolution is a request from a fourth identified secondary station in an unresponsive state to transfer to a responsive state, and in the event that the information received is the transfer request from a fourth identified secondary station, transferring the fourth identified secondary stations in an unresponsive state, to a responsive state, and providing network access to the transferred, fourth identified secondary station.

22. The method of claim 1 wherein step (h) further comprises:

dynamically determining the relative frequencies of transmission of specific polls, limited contention polls, and general contention polls by increasing the relative frequency of transmission of specific polls in response to increasing network data transmission to the primary station.

23. The method of claim 1 wherein step (h) further comprises:

dynamically determining the relative frequencies of transmission of specific polls, limited contention polls, and general contention polls by increasing the relative frequency of transmission of general polls in response to decreasing network data transmission to the primary station.

24. The method of claim 1 wherein step (h) further comprises:

dynamically determining the relative frequencies of transmission of specific polls, limited contention polls, and general contention polls by increasing the relative frequency of transmission of general polls in response to an increasing frequency of collision information received in response to a plurality of general polls.

25. The method of claim 1 wherein step (h) further comprises:

dynamically determining the relative frequencies of transmission of specific polls, limited contention polls, and general contention polls by increasing the frequency of specific polls in response to an increasing frequency of collision information received in response to a plurality of limited contention polls.

26. A method of controlling access to a network for information transmission and reception, the network having a primary station coupleable to a plurality of secondary stations via a communications medium, the communications medium having a plurality of communications channels, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, on a first communications channel of the plurality of communications channels, the specific poll containing an identification of the first secondary station of the plurality of secondary stations in an active state;

(b) the primary station receiving information on a second communications channel of the plurality of communications channels, in response to the specific poll, from the first secondary station in an active state identified in the specific poll;

(c) transmitting a limited contention poll from the primary station, on a third communications channel of the plurality of communications channels, to a plurality of secondary stations in an idle state, the limited contention poll containing an identification of at least one of the plurality of secondary stations in an idle state;

(d) providing network access to a second secondary station of the plurality of secondary stations in an idle state by the primary station receiving information on a fourth communications channel of the plurality of communications channels, in response to the limited contention poll, from the second secondary station in an idle state identified in the limited contention poll and transmitting a limited contention poll acknowledgment to the second identified secondary station;

(e) transmitting a general contention poll from the primary station, on a fifth communications channel of the plurality of communications channels, to at least one of the plurality of secondary stations in an unresponsive state;

(f) receiving information, on a sixth communications channel of the plurality of communications channels, from any of the plurality of secondary stations in an unresponsive state in response to the general contention poll;

(g) determining whether the information received in step (f), in response to the general contention poll, is a transfer request from a third identified secondary station in an unresponsive state to transfer to a responsive state, and in the event that the information received is a transfer request from a third identified secondary station, transferring the third identified secondary station in an unresponsive state, to a responsive state, and providing network access to the transferred, third identified secondary station on at least one of the plurality of communications channels;

(h) dynamically determining the relative frequencies of repetition of steps (a) and (b), steps (c) and (d), and steps (e) through (g), inclusive; and (i) repeating steps (a) and (b), steps (c) and (d), and steps (e) through (g), inclusive, in relative proportion to the dynamically determined relative frequencies.

27. The method of claim 26, wherein step (d) further comprises:

(d1) determining whether the information received by the primary station in response to the limited contention poll is collision information.

28. The method of claim 27, further comprising:

(d2) transmitting a first limited contention poll for collision resolution from the primary station, on at least one of the plurality of communications channels, to a first subset of the plurality of secondary stations in an idle state which had been identified in the preceding limited contention poll;

(d3) receiving information from at least one of the secondary stations of the first subset of the plurality of secondary stations in an idle state in response to the first limited contention poll for collision resolution, on at least one of the plurality of communications channels; and (d4) determining whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station on at least one of the plurality of communications channels and providing network access to the fourth identified secondary station.

29. The method of claim 28, further comprising:

(d5) determining whether the information received by the primary station in response to an immediately preceding limited contention poll for collision resolution is further collision information.

30. The method of claim 29, further comprising:

(d6) transmitting a successive limited contention poll for collision resolution from the primary station, in response to further collision information, on at least one of the plurality of communications channels, to a successive subset of the plurality of secondary stations in an idle state which had been identified in the immediately preceding limited contention poll for collision resolution;

(d7) receiving information from at least one of the secondary stations of the successive subset of the plurality of secondary stations in an idle state in response to the successive limited contention poll for collision resolution, on at least one of the plurality of communications channels; and (d8) determining whether the information received in response to the successive limited contention poll for collision resolution is a valid response from a fifth identified secondary station in an idle state, and in the event that the information received is a valid response from a fifth identified secondary station, transmitting a limited contention poll acknowledgment to the fifth identified secondary station on at least one of the plurality of communications channels and providing network access to the fifth identified secondary station.

31. The method of claim 30, further comprising:

(d9) repeating steps (d5) through (d8), inclusive, until no further collision information has been received by the primary station in response to a successive limited contention poll for collision resolution.

32. The method of claim 31 wherein the successive subset is smaller than the immediately preceding subset.

33. The method of claim 31 wherein the successive subset contains fewer addresses of secondary stations in an idle state than the immediately preceding subset.

34. The method of claim 31 wherein the successive subset contains one half of the addresses of secondary stations which had been contained in the immediately preceding subset.

35. The method of claim 31, further comprising:

(d10) transmitting a second limited contention poll for collision resolution from the primary station, on at least one of the plurality of communications channels, to a second subset of the plurality of secondary stations in an idle state which had been identified in the limited contention poll and which had not been identified in the first limited contention poll for collision resolution from the primary station to the first subset of the plurality of secondary stations in an idle state;

(d11) receiving information from at least one of the secondary stations of the second subset of the plurality of secondary stations in an idle state in response to the second limited contention poll for collision resolution, on at least one of the plurality of communications channels; and (d12) determining whether the information received in response to the second limited contention poll for collision resolution is a valid response from a sixth identified secondary station in an idle state, and in the event that the information received is a valid response from a sixth identified secondary station, transmitting a limited contention poll acknowledgment to the sixth identified secondary station on at least one of the plurality of communications channels and providing network access to the sixth identified secondary station.

36. The method of claim 35, further comprising:

(d13) determining whether the information received by the primary station in response to an immediately preceding limited contention poll for collision resolution is further collision information.

37. The method of claim 36, further comprising:

(d14) transmitting a successive limited contention poll for collision resolution from the primary station, in response to further collision information, on at least one of the plurality of communications channels, to a successive subset of the plurality of secondary stations in an idle state which had been identified in the immediately preceding limited contention poll for collision resolution;

(d15) receiving information from at least one of the secondary stations of the successive subset of the plurality of secondary stations in an idle state in response to the successive limited contention poll for collision resolution, on at least one of the plurality of communications channels; and (d16) determining whether the information received in response to the successive limited contention poll for collision resolution is a valid response from a seventh identified secondary station in an idle state, and in the event that the information received is a valid response from a seventh identified secondary station, transmitting a limited contention poll acknowledgment to the seventh identified secondary station on at least one of the plurality of communications channels and providing network access to the seventh identified secondary station.

38. The method of claim 37, further comprising:

(d17) repeating steps (d13) through (d16), inclusive, until no further collision information has been received by the primary station in response to a successive limited contention poll for collision resolution.

39. The method of claim 38 wherein the successive subset is smaller than the immediately preceding subset.

40. The method of claim 38 wherein the successive subset contains fewer addresses of secondary stations in an idle state than the immediately preceding subset.

41. The method of claim 38 wherein the successive subset contains one half of the addresses of secondary stations which had been contained in the immediately preceding subset.

42. The method of claim 31, further comprising:

(j) maintaining a first database of addresses of the plurality of secondary stations which may be in an active state;

(k) maintaining a second database of addresses of the plurality of secondary stations which may be in an idle state; and (l) maintaining a third database of addresses of the plurality of secondary stations which may be in an unresponsive state.

43. The method of claim 42, further comprising:

(m) revising the first database, the second database and the third database in response to the information received in response to at least one of a plurality of polls, including a specific poll, a limited contention poll, a general contention poll, a limited contention poll for collision resolution, and a general contention poll for collision resolution.

44. The method of claim 26, wherein step (g) further comprises:

determining whether the information received by the primary station in response to the general poll is collision information;

transmitting a general poll for collision resolution from the primary station, on at least one of the plurality of communications channels, to at least one of the plurality of secondary stations in an unresponsive state, in the event that the information received by the primary station in response to the general poll is collision information;

receiving information, on at least one of the plurality of communications channels, from at least one of the plurality of secondary stations in an unresponsive state which had responded to the preceding general poll of step (f); and determining whether the information received in response to the general poll for collision resolution is a request from a fourth identified secondary station in an unresponsive state to transfer to a responsive state, and in the event that the information received is the transfer request from a fourth identified secondary station, transferring the fourth identified secondary stations in an unresponsive state, to a responsive state, and providing network access on at least one of the plurality of communications channels to the transferred, fourth identified secondary station.

45. The method of claim 26 wherein step (h) further comprises:

dynamically determining the relative frequencies of transmission of specific polls, limited contention polls, and general contention polls by increasing the relative frequency of transmission of specific polls in response to increasing network data transmission to the primary station.

46. The method of claim 26 wherein step (h) further comprises:

dynamically determining the relative frequencies of transmission of specific polls, limited contention polls, and general contention polls by increasing the relative frequency of transmission of general polls in response to decreasing network data transmission to the primary station.

47. The method of claim 26 wherein step (h) further comprises:

dynamically determining the relative frequencies of transmission of specific polls, limited contention polls, and general contention polls by increasing the relative frequency of transmission of general polls in response to an increasing frequency of collision information received in response to a plurality of general polls.

48. The method of claim 26 wherein step (h) further comprises:

dynamically determining the relative frequencies of transmission of specific polls, limited contention polls, and general contention polls by increasing the frequency of specific polls in response to an increasing frequency of collision information received in response to a plurality of limited contention polls.

49. The method of claim 26 wherein step (h) further comprises:

dynamically determining the relative frequencies of transmission of specific polls, limited contention polls, and general contention polls by increasing the relative proportion of the plurality of communications channels allocated for the transmission of specific polls in response to an increasing frequency of collision information received in response to a plurality of limited contention polls.

50. The method of claim 26 wherein step (h) further comprises:

dynamically determining the relative frequencies of transmission of specific polls, limited contention polls, and general contention polls by increasing the relative proportion of the plurality of communications channels allocated for the transmission of specific polls in response to increasing network data transmission to the primary station.

51. The method of claim 26 wherein step (h) further comprises:

dynamically determining the relative frequencies of transmission of specific polls, limited contention polls, and general contention polls by increasing the relative proportion of the plurality of communications channels allocated for the transmission of general polls in response to decreasing network data transmission to the primary station.

52. The method of claim 26 wherein step (h) further comprises:

dynamically determining the relative frequencies of transmission of specific polls, limited contention polls, and general contention polls by increasing the relative proportion of the plurality of communications channels allocated for the transmission of general polls in response to an increasing frequency of collision information received in response to a plurality of general polls.

53. An apparatus for controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, each of the plurality of secondary stations further having a distinct address, the primary station having a receiver coupleable to the communications channel for the reception of information from the plurality of secondary stations, the primary station further having a transmitter coupleable to the communications channel for the transmission of information to the plurality of secondary stations; the network access controlling apparatus comprising:

a first memory storing a first database, the first database containing the addresses of a plurality of secondary stations in an active state;

a second memory storing a second database, the second database containing the addresses of a plurality of secondary stations in an idle state;

a third memory storing a third database, the third database containing the addresses of a plurality of secondary stations in an unresponsive state; and a controller, the controller coupled to the first memory, to the second memory and to the third memory, the controller coupleable to the receiver and to the transmitter, the controller providing network access to a first secondary station of the plurality of secondary stations in an active state by transmitting a specific poll, the specific poll containing an identification address of the first secondary station of the plurality of secondary stations in an active state, and by receiving information, in response to the specific poll, from the first secondary stations in an active state identified in the specific poll; the controller providing network access to a second secondary station of the plurality of secondary stations in an idle state by transmitting a limited contention poll to a plurality of secondary stations in an idle state, the limited contention poll containing an identification of at least one of the plurality of secondary stations in an idle state, by receiving information, in response to the limited contention poll, from the second secondary station in an idle state identified in the limited contention poll and transmitting a limited contention poll acknowledgment to the second identified secondary station; the controller further providing network access to a third secondary station of the plurality of secondary stations in an unresponsive state by transmitting a general poll to at least one of the plurality of secondary stations in an unresponsive state, by receiving information from any of the plurality of secondary stations in an unresponsive state in response to the general poll, by determining whether the information received, in response to the general poll, is a transfer request from a third identified secondary station in an unresponsive state to transfer to a responsive state, and in response to a transfer request from a third identified secondary station, the controller transferring the third identified secondary stations in an unresponsive state, to a responsive state; the controller further responsive to the information received to dynamically determine the relative frequencies of transmission of a plurality of specific polls, transmission of a plurality of limited contention polls, and transmission of a plurality of general contention polls, the controller further responsive to transmit a plurality of specific polls, limited contention polls and general polls in relative proportion to the dynamically determined relative frequencies.

54. The apparatus of claim 53, wherein the controller is further responsive to determine whether the information received by the primary station in response to the limited contention poll is collision information.

55. The apparatus of claim 54, wherein the controller is further:

responsive to transmit a first limited contention poll for collision resolution from the primary station to a first subset of the plurality of secondary stations in an idle state which had been identified in the preceding limited contention poll;

receive information from at least one of the secondary stations of the first subset of the plurality of secondary stations in an idle state in response to the first limited contention poll for collision resolution; and determine whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station.

56. The apparatus of claim 55, wherein the controller is further responsive to determine whether the information received in response to an immediately preceding limited contention poll for collision resolution is further collision information.

57. The apparatus of claim 56, wherein the controller is further:

responsive to transmit a successive limited contention poll for collision resolution, in response to further collision information, to a successive subset of the plurality of secondary stations in an idle state which had been identified in the immediately preceding limited contention poll for collision resolution;

receive information from at least one of the secondary stations of the successive subset of the plurality of secondary stations in an idle state in response to the successive limited contention poll for collision resolution; and determine whether the information received in response to the successive limited contention poll for collision resolution is a valid response from a fifth identified secondary station in an idle state, and in the event that the information received is a valid response from a fifth identified secondary station, transmit a limited contention poll acknowledgment to the fifth identified secondary station and providing network access to the fifth identified secondary station.

58. The apparatus of claim 57, wherein the controller is further:

responsive to repeat the procedures of transmitting, receiving and determining until no further collision information has been received in response to a successive limited contention poll for collision resolution.

59. The apparatus of claim 58, wherein the controller is further responsive to:

transmit a second limited contention poll for collision resolution to a second subset of the plurality of secondary stations in an idle state which had been identified in the limited contention poll and which had not been identified in the first limited contention poll for collision resolution to the first subset of the plurality of secondary stations in an idle state;

receive information from at least one of the secondary stations of the second subset of the plurality of secondary stations in an idle state in response to the second limited contention poll for collision resolution; and determine whether the information received in response to the second limited contention poll for collision resolution is a valid response from a sixth identified secondary station in an idle state, and in the event that the information received is a valid response from a sixth identified secondary station, transmit a limited contention poll acknowledgment to the sixth identified secondary station and providing network access to the sixth identified secondary station.

60. The apparatus of claim 59, wherein the controller is further:

responsive to determine whether the information received in response to an immediately preceding limited contention poll for collision resolution is further collision information.

61. The apparatus of claim 60, wherein the controller is further responsive to:

transmit a successive limited contention poll for collision resolution from the primary station, in response to further collision information, to a successive subset of the plurality of secondary stations in an idle state which had been identified in the immediately preceding limited contention poll for collision resolution;

receive information from at least one of the secondary stations of the successive subset of the plurality of secondary stations in an idle state in response to the successive limited contention poll for collision resolution; and determine whether the information received in response to the successive limited contention poll for collision resolution is a valid response from a seventh identified secondary station in an idle state, and in the event that the information received is a valid response from a seventh identified secondary station, transmit a limited contention poll acknowledgment to the seventh identified secondary station and provide network access to the seventh identified secondary station.

62. The apparatus of claim 61, wherein the controller is further responsive to:

continue to transmit a successive limited contention poll for collision resolution from the primary station, in response to further collision information, to a successive subset of the plurality of secondary stations in an idle state which had been identified in the immediately preceding limited contention poll for collision resolution;

continue to receive information from at least one of the secondary stations of the successive subset of the plurality of secondary stations in an idle state in response to the successive limited contention poll for collision resolution; and continue to determine whether the information received in response to the successive limited contention poll for collision resolution is a valid response from a seventh identified secondary station in an idle state, and in the event that the information received is a valid response from a seventh identified secondary station, transmit a limited contention poll acknowledgment to the seventh identified secondary station and provide network access to the seventh identified secondary station;

until no further collision information has been received in response to a successive limited contention poll for collision resolution.

63. The apparatus of claim 53, wherein the controller is further responsive to revise the first database, the second database and the third database in response to the information received in response to the specific poll.

64. The apparatus of claim 53, wherein the controller is further responsive to revise the first database, the second database and the third database in response to the information received in response to the limited contention poll.

65. The apparatus of claim 53, wherein the controller is further responsive to revise the first database, the second database and the third database in response to the information received in response to the general contention poll.

66. The apparatus of claim 53, wherein the controller is further responsive to dynamically determine the relative frequencies of transmission of specific polls, limited contention polls, and general contention polls by increasing the relative frequency of transmission of specific polls in response to increasing network data transmission to the primary station.

67. The apparatus of claim 53, wherein the controller is further responsive to dynamically determine the relative frequencies of transmission of specific polls, limited contention polls, and general contention polls by increasing the relative frequency of transmission of general polls in response to decreasing network data transmission to the primary station.

68. The apparatus of claim 53, wherein the controller is further responsive to dynamically determine the relative frequencies of transmission of specific polls, limited contention polls, and general contention polls by increasing the relative frequency of transmission of general polls in response to an increasing frequency of collision information received in response to a plurality of general polls.

69. The apparatus of claim 53, wherein the controller is further responsive to dynamically determine the relative frequencies of transmission of specific polls, limited contention polls, and general contention polls by increasing the frequency of specific polls in response to an increasing frequency of collision information received in response to a plurality of limited contention polls.

70. The apparatus of claim 53, wherein:

the controller further determines whether the information received in response to the general poll is collision information;

the controller, in response to collision information, transmits a general poll for collision resolution to at least one of the plurality of secondary stations in an unresponsive state; the controller further providing network access to a fourth secondary station by receiving information from at least one of the plurality of secondary stations in an unresponsive state which had responded to the preceding general poll, and determining whether the information received in response to the general poll for collision resolution is a request from a fourth identified secondary station in an unresponsive state to transfer to a responsive state, and in response to the transfer request from a fourth identified secondary station, the controller transferring the fourth identified secondary station in an unresponsive state, to a responsive state.

71. The apparatus of claim 53, wherein the controller is further responsive to dynamically determine the relative frequencies of transmission of specific polls, limited contention polls, and general contention polls, by changing the relative proportion of a plurality of communications channels allocated for the transmission of specific polls, limited contention polls, and general contention polls.

72. A method of controlling access to a network for information transmission and reception, the network having a primary station coupleable to a plurality of secondary stations via a communications channel, each of the plurality of secondary stations having a plurality of states, the plurality of states of the plurality of secondary stations including an unresponsive state, a first responsive state referred to as an active state, and a second responsive state referred to as an idle state, the method comprising:

(a) providing network access to a first secondary station of the plurality of secondary stations in an active state by transmitting a specific poll from the primary station, the specific poll containing an identification of the first secondary station of the plurality of secondary stations in an active state;

(b) the primary station receiving information, in response to the specific poll, from the first secondary station in an active state identified in the specific poll;

(c) transmitting a limited contention poll from the primary station to a plurality of secondary stations in an idle state, the limited contention poll containing an identification of at least one of the plurality of secondary stations in an idle state;

(d) the primary station receiving information, in response to the limited contention poll, from a second secondary station in an idle state identified in the limited contention poll;

(e) determining if the information received in response to the limited contention poll is a valid response, and if the information received in response to the limited contention poll is a valid response, transmitting a limited contention poll acknowledgment to the second identified secondary station and providing network access to the second secondary station;

(f) determining if the information received by the primary station in response to the limited contention poll is collision information;

(g) transmitting a first limited contention poll for collision resolution from the primary station to a first subset of the plurality of secondary stations in an idle state which had been identified in the preceding limited contention poll;

(h) receiving information from at least one of the secondary stations of the first subset of the plurality of secondary stations in an idle state in response to the first limited contention poll for collision resolution;

(i) determining whether the information received in response to the first limited contention poll for collision resolution is a valid response from a fourth identified secondary station in an idle state, and in the event that the information received is a valid response from a fourth identified secondary station, transmitting a limited contention poll acknowledgment to the fourth identified secondary station and providing network access to the fourth identified secondary station;

(j) determining whether the information received by the primary station in response to an immediately preceding limited contention poll for collision resolution is further collision information;

(k) transmitting a successive limited contention poll for collision resolution from the primary station, in response to further collision information, to a successive subset of the plurality of secondary stations in an idle state which had been identified in the immediately preceding limited contention poll for collision resolution;

(l) receiving information from at least one of the secondary stations of the successive subset of the plurality of secondary stations in an idle state in response to the successive limited contention poll for collision resolution;

(m) determining whether the information received in response to the successive limited contention poll for collision resolution is a valid response from a fifth identified secondary station in an idle state, and in the event that the information received is a valid response from a fifth identified secondary station, transmitting a limited contention poll acknowledgment to the fifth identified secondary station and providing network access to the fifth identified secondary station;

(n) repeating steps (j) through (m), inclusive, until no further collision information has been received by the primary station in response to a successive limited contention poll for collision resolution;

(o) transmitting a second limited contention poll for collision resolution from the primary station to a second subset of the plurality of secondary stations in an idle state which had been identified in the limited contention poll and which had not been identified in the first limited contention poll for collision resolution from the primary station to the first subset of the plurality of secondary stations in an idle state;

(p) receiving information from at least one of the secondary stations of the second subset of the plurality of secondary stations in an idle state in response to the second limited contention poll for collision resolution; and (q) determining whether the information received in response to the second limited contention poll for collision resolution is a valid response from a sixth identified secondary station in an idle state, and in the event that the information received is a valid response from a sixth identified secondary station, transmitting a limited contention poll acknowledgment to the sixth identified secondary station and providing network access to the sixth identified secondary station;

(r) determining whether the information received by the primary station in response to an immediately preceding limited contention poll for collision resolution is further collision information;

(s) transmitting a successive limited contention poll for collision resolution from the primary station, in response to further collision information, to a successive subset of the plurality of secondary stations in an idle state which had been identified in the immediately preceding limited contention poll for collision resolution;

(t) receiving information from at least one of the secondary stations of the successive subset of the plurality of secondary stations in an idle state in response to the successive limited contention poll for collision resolution;

(u) determining whether the information received in response to the successive limited contention poll for collision resolution is a valid response from a seventh identified secondary station in an idle state, and in the event that the information received is a valid response from a seventh identified secondary station, transmitting a limited contention poll acknowledgment to the seventh identified secondary station and providing network access to the seventh identified secondary station;

(v) repeating steps (r) through (v), inclusive, until no further collision information has been received by the primary station in response to a successive limited contention poll for collision resolution;

(w) transmitting a general contention poll from the primary station to at least one of the plurality of secondary stations in an unresponsive state;

(x) receiving information from any of the plurality of secondary stations in an unresponsive state in response to the general contention poll;

(y) determining whether the information received in step (x), in response to the general contention poll, is a transfer request from an identified secondary station in an unresponsive state to transfer to a responsive state, and in the event that the information received is a transfer request from an identified secondary station, transferring the identified secondary station in an unresponsive state, to a responsive state, and providing network access to the transferred, identified secondary station;

step (g) further comprises:

(z) determining whether the information received by the primary station in step (x) in response to the general poll is collision information; transmitting a general poll for collision resolution from the primary station to at least one of the plurality of secondary stations in an unresponsive state, in the event that the information received by the primary station in response to the general poll is collision information; receiving information from at least one of the plurality of secondary stations in an unresponsive state which had responded to the preceding general poll of step (w); determining whether the information received in response to the general poll for collision resolution is a request from an identified secondary station in an unresponsive state to transfer to a responsive state, and in the event that the information received is the transfer request from an identified secondary station, transferring the identified secondary stations in an unresponsive state, to a responsive state, and providing network access to the transferred, identified secondary station;

(aa) dynamically determining the relative frequencies of repetition of specific polling procedures, limited contention access procedures, and general contention access procedures; and (bb) repeating specific polling procedures, limited contention access procedures, and general contention access procedures, in relative proportion to the dynamically determined relative frequencies.

\* \* \* \* \*